United States Patent
Wang et al.

(10) Patent No.: US 10,912,002 B2
(45) Date of Patent: Feb. 2, 2021

(54) CELL RESELECTION RACE CONDITION HANDLING AND REDUCTION IN UNNECESSARY CELL RESELECTIONS

(71) Applicant: QUALCOMM Incorporated, San Diego, CA (US)

(72) Inventors: Shanshan Wang, San Diego, CA (US); Aziz Gholmieh, Del Mar, CA (US); Yongle Wu, San Diego, CA (US); Reza Shahidi, San Diego, CA (US); Gopinath Murali Chinnathambi, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/374,673

(22) Filed: Apr. 3, 2019

(65) Prior Publication Data

US 2020/0322863 A1  Oct. 8, 2020

(51) Int. Cl.
*H04W 36/04* (2009.01)
*H04W 36/30* (2009.01)
*H04W 36/00* (2009.01)

(52) U.S. Cl.
CPC ....... *H04W 36/30* (2013.01); *H04W 36/0079* (2018.08); *H04W 36/04* (2013.01)

(58) Field of Classification Search
CPC ... H04W 48/20; H04W 36/32; H04W 64/006; H04W 36/04; H04W 36/24;
(Continued)

(56) References Cited

U.S. PATENT DOCUMENTS

2004/0082328 A1* 4/2004 Japenga ................ H04W 36/30
455/436
2006/0258386 A1* 11/2006 Jeong .................... H04W 36/24
455/525
2009/0117905 A1* 5/2009 Watanabe ............. H04W 48/20
455/437
2012/0264435 A1 10/2012 Rangaiah et al.
2013/0189993 A1* 7/2013 Han ....................... H04W 36/08
455/437
(Continued)

FOREIGN PATENT DOCUMENTS

WO WO-2019034996 A1 2/2019

OTHER PUBLICATIONS

3GPP TS25.304 v1.0.0 (Apr. 1999) "3rd Generation Partnership Project (3GPP); Technical Specification Group (TSG) RAN; Working Group 2 (WG2); UE Procedures in Idle Mode", pp. 1-29.
(Continued)

*Primary Examiner* — Jung Liu
(74) *Attorney, Agent, or Firm* — Haynes and Boone, LLP

(57) ABSTRACT

Wireless communications systems and methods related to improving user equipment (UE) mobility performance are provided. A wireless communication device camps on a first cell operating on a first carrier frequency. The wireless communication device receives, from the first cell, cell selection priority information indicating a priority for each of a plurality of carrier frequencies. The wireless communication device evaluates each of two or more candidate cells over an evaluation time duration associated with each candidate cell, wherein an end time of the evaluation time duration of a candidate cell associated with a lower priority carrier frequency is configured to be after an end time of the evaluation time duration of a candidate cell associated with a higher priority carrier frequency. The first wireless communication device selects a second cell from the two or more candidate cells for camping based at least in part on the evaluation of the second cell.

30 Claims, 13 Drawing Sheets

(58) Field of Classification Search
CPC ...... H04W 84/042; H04W 72/04; H04B 7/00;
H04L 5/0035; H04L 5/0055; H04L
5/0057; H04L 12/2869; H04L 12/5695;
H04L 47/00; H04L 47/70; H04L 47/78;
H04L 47/821; H04L 47/827
See application file for complete search history.

(56) References Cited

U.S. PATENT DOCUMENTS

2014/0146794 A1* 5/2014 Dalsgaard ............ H04W 24/02
370/332
2018/0084469 A1 3/2018 Namboodiri et al.

OTHER PUBLICATIONS

Email Discussion Rapporteur (Ericsson): "[89#20] [LTE-L23] SIB cquisition Failure (Ericsson) Email Discussion Report", 3GPP TSG-RAN WG2 #89bis, 3GPP Draft; R2-151677 WAS R2-151368 SIBREADFAILUREEMAILDISCREPORTREV1, 3rd Generation Partnership Project (3GPP), Mobile Competence Centre; 650, Route Des Lucioles; F-06921 Sophia-Antipolis Cedex, vol. RAN WG2, No. Bratislava, Slovakia; Apr. 20, 2015-Apr. 24, 2015, Apr. 19, 2015 (Apr. 19, 2015), pp. 1-14, XP050936580, Retrieved from the Internet: URL: http://www.3gpp.org/ftp/Meetings_3GPP_SYNC/RAN2/Docs/ [retrieved on Apr. 19, 2015].

Samsung: "On Demand SI: Further Details of MSG1 Approach", 3GPP TSG-RAN WG2 Meeting #98, 3GPP Draft; R2-1704049_On Demand SI_MSG1 Approach Details, 3rd Generation Partnership Project (3GPP), Mobile Competence Centre, 650, Route Des Lucioles, F-06921, Sophia-Antipolis Cedex, France, vol. RAN WG2, No. Hangzhou, China; May 15, 2017-May 17, 2017, May 14, 2017, 6 Pages, XP051274662, Retrieved from the Internet: URL: http://www.3gpp.org/ftp/Meetings_3GPP_SYNC/RAN2/Docs/ [retrieved on May 14, 2017], p. 1, lines 816, p. 2, lines 1-20, figure 1.

* cited by examiner

CELL RESELECTION RACE CONDITION HANDLING AND REDUCTION IN UNNECESSARY CELL RESELECTIONS

TECHNICAL FIELD

This application relates to wireless communication systems, and more particularly to improving user equipment (UE) mobility performance in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth and throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Maintaining mobility is important in a wireless communication network, where a UE may travel from one coverage area or cell to another coverage area or cell. In general, a UE may be in an idle state or a connected state with respect to a network. An idle mode UE is not attached to any BS and there are no network and/or radio resources allocated to the UE. The UE's location is known to the network, for example, within a group of cells referred to as a tracking area. While a UE is not attached to any BS, the UE is required to select a suitable cell to camp on. The procedure of a UE selecting and camping on a cell is referred to as cell selection. While camping on a cell, the UE continues to monitor other cells. When the UE detects a degradation in the received signal quality from the currently camped cell, for example, due to mobility, the UE may decide to camp on another cell. Formally speaking, the procedure of evaluating and reselecting another cell while the UE is currently camped on a serving cell is referred to as cell reselection. However, it is understood that the procedure formally referred to as cell reselection may be referred to informally as cell selection for ease of reference. Hence, when it is understood from the context that the UE is currently camped on a serving cell and is evaluating other cells for camping, terms like "UE selects" or "selecting" or "selection" of another cell may be used. As such, in such situations, cell selection and cell reselection may be used interchangeably.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication include camping, by a wireless communication device, on a first cell operating on a first carrier frequency; receiving, by the wireless communication device from the first cell, cell selection priority information indicating a priority for each of a plurality of carrier frequencies; evaluating, by the wireless communication device, each of two or more candidate cells over an evaluation time duration associated with each candidate cell, wherein an end time of the evaluation time duration of a candidate cell associated with a lower priority carrier frequency is configured to be after an end time of the evaluation time duration of a candidate cell associated with a higher priority carrier frequency; and selecting, by the wireless communication device, a second cell from the two or more candidate cells for camping based at least in part on the evaluation of the second cell over the evaluation time duration of the second cell.

In an additional aspect of the disclosure, a method of wireless communication, includes camping, by a wireless communication device, on a serving cell; receiving, by the wireless communication device, information associated with a plurality of intra-frequency neighboring cells; determining, by the wireless communication device, a signal strength of a first candidate cell of the plurality of intra-frequency neighboring cells at a first timer expiration time; determining, by the wireless communication device, a signal strength of a second candidate cell of the plurality of intra-frequency neighboring cells at the first timer expiration time; and selecting, by the wireless communication device, one of the first candidate cell or the second candidate cell for camping based on a comparison of the signal strength of the first candidate cell and the signal strength of the second candidate cell.

In an additional aspect of the disclosure, an apparatus includes a transceiver configured to receive, from a first cell operating on a first carrier frequency, cell selection priority information indicating a priority for each of a plurality of carrier frequencies; a processor configured to camp on the first cell; evaluate each of two or more candidate cells over an evaluation time duration associated with each candidate cell, wherein an end time of the evaluation time duration of a candidate cell associated with a lower priority carrier frequency is configured to be after an end time of the evaluation time duration of a candidate cell associated with a higher priority carrier frequency; and select a second cell from the two or more candidate cells for camping based at least in part on the evaluation of the second cell over the evaluation time duration of the second cell.

In an additional aspect of the disclosure, an apparatus comprising a transceiver configured to receive information associated with a plurality of intra-frequency neighboring cells associated with a serving cell; and a processor configured to camp on the serving cell; determine a signal strength of a first candidate cell of the plurality of intra-frequency neighboring cells at a first timer expiration time; determine a signal strength of a second candidate cell of the plurality of intra-frequency neighboring cells at the first timer expiration time; and select one of the first candidate cell or the second candidate cell for camping based on a comparison of the signal strength of the first candidate cell and the signal strength of the second candidate cell.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
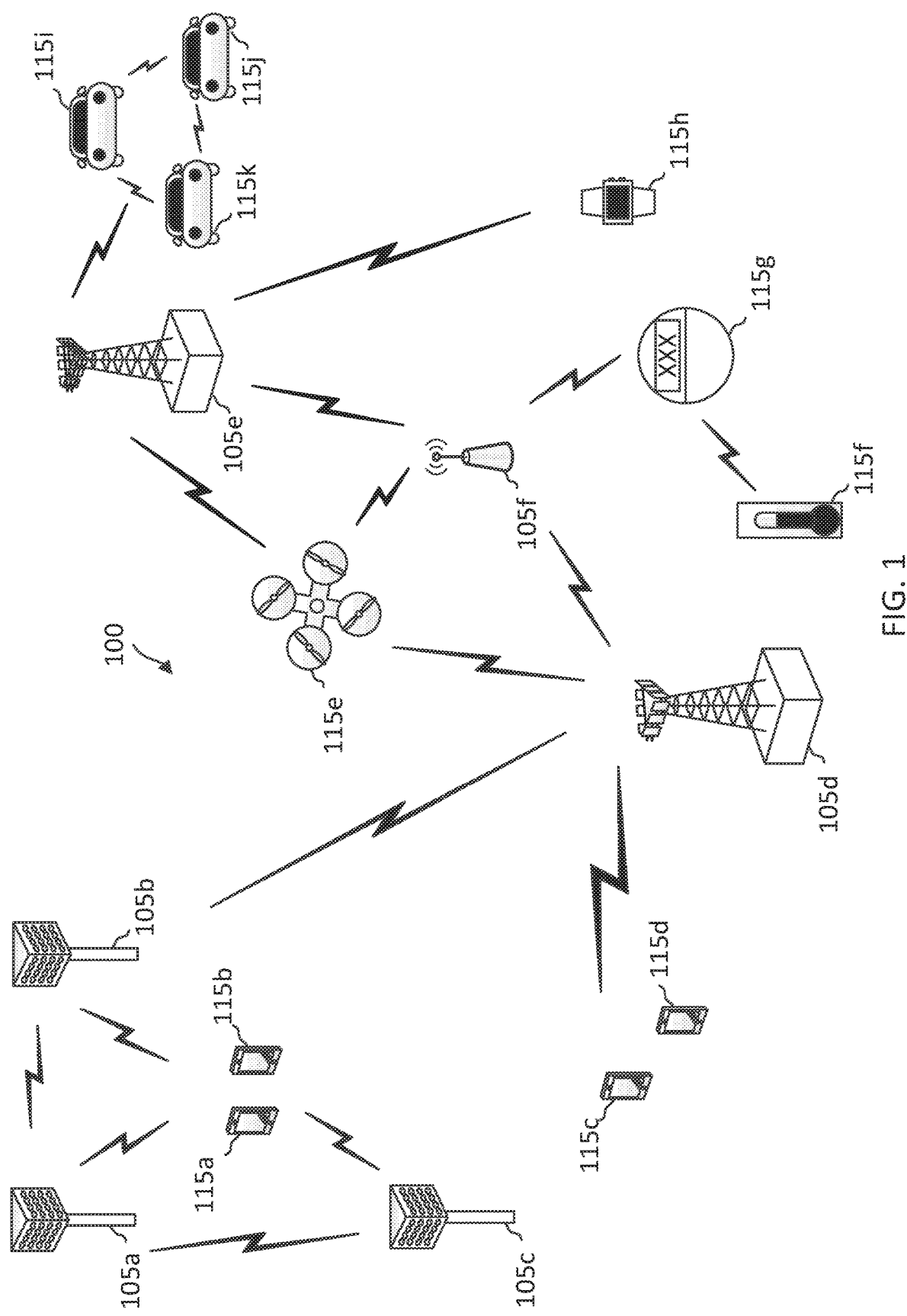
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS serving a cell may broadcast system information, for example, in the form of master information block (MIB) and system information blocks (SIBs) to facilitate communications with UEs in the cell. The system information may include neighboring cell information, for example, indicating one or more intra-frequency neighboring cells, one or more inter-frequency neighboring cells, and/or one or more inter-frequency neighboring cells to the serving cell. Each cell may operate over a carrier frequency. In some instances, multiple cells may operate over the same carrier frequency. The system information may indicate cell reselection priorities for the carrier frequency of the serving cell and carrier frequencies of the neighboring cells. Thus, each neighboring cell may be associated with a cell reselection priority based on the operating carrier frequency of the cell. The system information may further indicate cell reselection criteria for each candidate cell to guide a UE in selecting a suitable cell for camping. The cell reselection criteria may include a signal threshold and/or a cell reselection timeout value. In some examples, the network or the BS may configure the UE to reselect to a high priority layer (e.g., a neighboring cell of a higher priority than the serving cell).

In an example, a UE may identify a cell from neighboring cells as a candidate cell when the received signal strength from the cell satisfies the signal threshold. The UE may evaluate the signal strength of a candidate cell for a duration of time, where the duration may be configured based on the cell reselection timeout value. When the signal strength of the candidate cell stays above the signal threshold for the duration, the UE may select the candidate cell for camping. In some examples, the UE may evaluate multiple candidate cells each having a signal strength meeting the signal threshold. The UE may begin the evaluations for the different candidate cells at different times, and thus the evaluations for the different cells may end at different times. If the UE simply reselects to a candidate cell (e.g., cell A) at the end of the evaluation, the UE may not necessarily select to a candidate cell (e.g., cell B) with the highest priority and/or the strongest signal strength among the candidate cells. Thus, the UE may camp on the selected cell (e.g., cell A) and reselect to the candidate cell (e.g., cell B) with the highest priority and/or the strongest signal shortly afterwards. The unnecessary cell reselection to cell A can cause the UE to consume power unnecessarily and may impact user experiences.

The present application describes mechanisms for a UE to reduce unnecessary cell reselection. For example, a UE may monitor and evaluate neighboring cells while camping on a serving cell. When the UE identifies a candidate cell, for example, based on signal measurements, the UE may start a timer for evaluating the signal strength of the candidate cell. The UE may configure the timer with an evaluation duration, that is a time duration during or over which the candidate cell is under evaluation, based on a reselection timeout value preconfigured for the candidate cell. In the disclosed embodiments, when the UE has multiple candidate cells (e.g., inter-frequency and/or inter-RAT candidate cells) having different frequency priorities, the UE gives priority to selection of cells that have a higher frequency priority. In other words, a lower-priority cell can be preempted by a higher-priority cell for the selection. When the UE has multiple intra-frequency candidate cells having the same priority as the serving cell, the UE gives priority to selection of cells that have a higher signal strength and/or satisfying a certain signal threshold for a longer duration.

In an embodiment, for inter-frequency and/or inter-RAT cell reselection, when the UE identifies a new candidate cell with a higher priority than other candidate cells (identified previously), the UE extends the evaluation duration (e.g., longer than 10 seconds) of the timers for the other candidate cells. As a result, the selection or the decision to select to the other candidate cells with lower priorities are delayed. As such, the evaluation of the highest-priority candidate cell may complete before the lower-priority candidate cells and the UE may select the highest-priority candidate cell upon the completion of the evaluation. If the UE fails to camp on the highest-priority candidate cell, the UE may evaluate a next highest candidate cell for selection using similar mechanisms. The UE may also limit the amount of time that the preemption process can occur. For example, if the UE continues to identify new candidate cells with a higher priority, the UE may terminate the preemption process and select to a highest priority cell from the candidate cells that are under evaluation at the time.

In an embodiment, for intra-frequency cell reselection, upon the evaluation completion (e.g., an expiration of a timer) for a candidate cell, the UE performs a one-shot signal measurement for each candidate cell that are under evaluation, but not yet completed (e.g., with an ongoing timer). The UE identifies a subset of the candidate cells that have a higher signal strength than the candidate cell with the evaluation completion by a certain threshold based on the one-shot signal measurements and/or the latest signal measurements of the candidate cells. The UE may select a cell with the strongest signal strength and/or with a signal strength satisfying a threshold for a longest duration from the subset for camping. Upon the selection, the UE may begin the camping process on the selected cell without having to wait for the evaluation period of the selected cell to complete or timeout from the timer. The UE may continue the evaluations of the other candidate cells while attempting to camp on the selected cell. If the UE fails to camp on the selected cell, the UE may select another cell from the candidate cells in the subset based on the continued evaluations for camping using similar mechanisms. The continued evaluation of the other candidate cells while attempting to camp on a selected cell allows the UE to quickly select to another cell upon the camping failure. The present disclosure may use the terms "cell reselection priority", "frequency priority", and "priority" interchangeably.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of the following configurations: three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a MIB, remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as a access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

When the UE 115 has no active data communication with the BS 105 after the network attachment, the UE 115 may return to RRC idle state by releasing the RRC connection. In some examples, the UE 115 may enter transition from an RRC connected state to an inactive state or RRC inactive state while maintaining an RRC connection with the BS 105. The or RRC inactive state allows the UE 115 to quickly return to the RRC connected state, which may be suitable for ultra-reliable low-latency communication (URLLC) type traffic. During an idle state or an inactive state, the UE 115 may perform channel measurements, perform cell reselection, update TA location, and/or monitor a paging channel. Mechanisms for performing mobility or cell reselection are described in greater detail herein.

Figure 2:
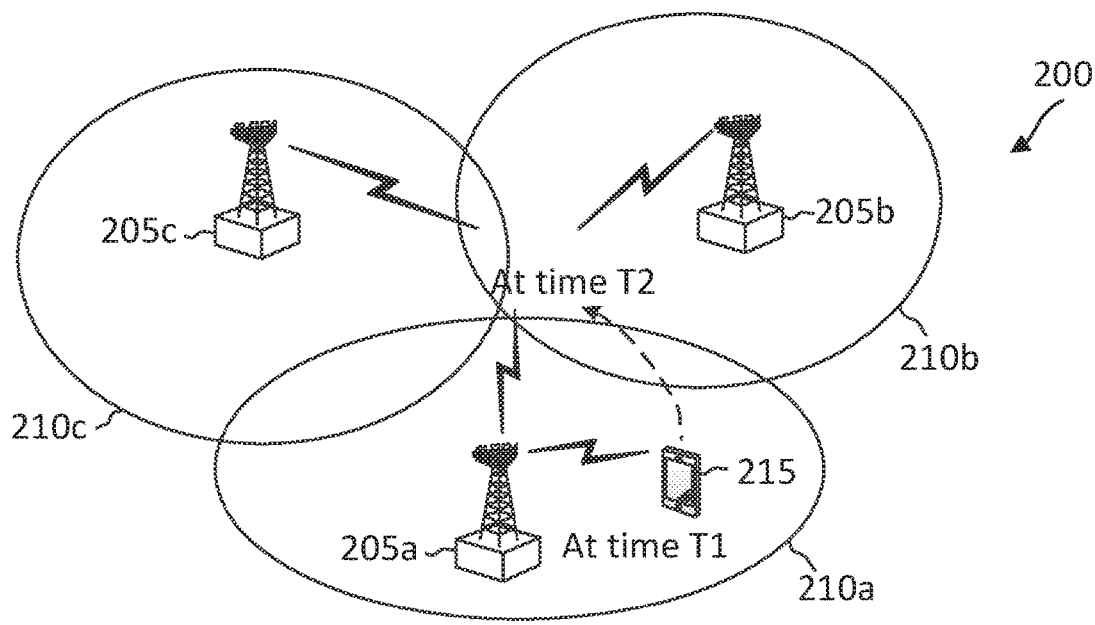
FIG. 2 illustrates a wireless communication network according to some embodiments of the present disclosure.
Figure 3:
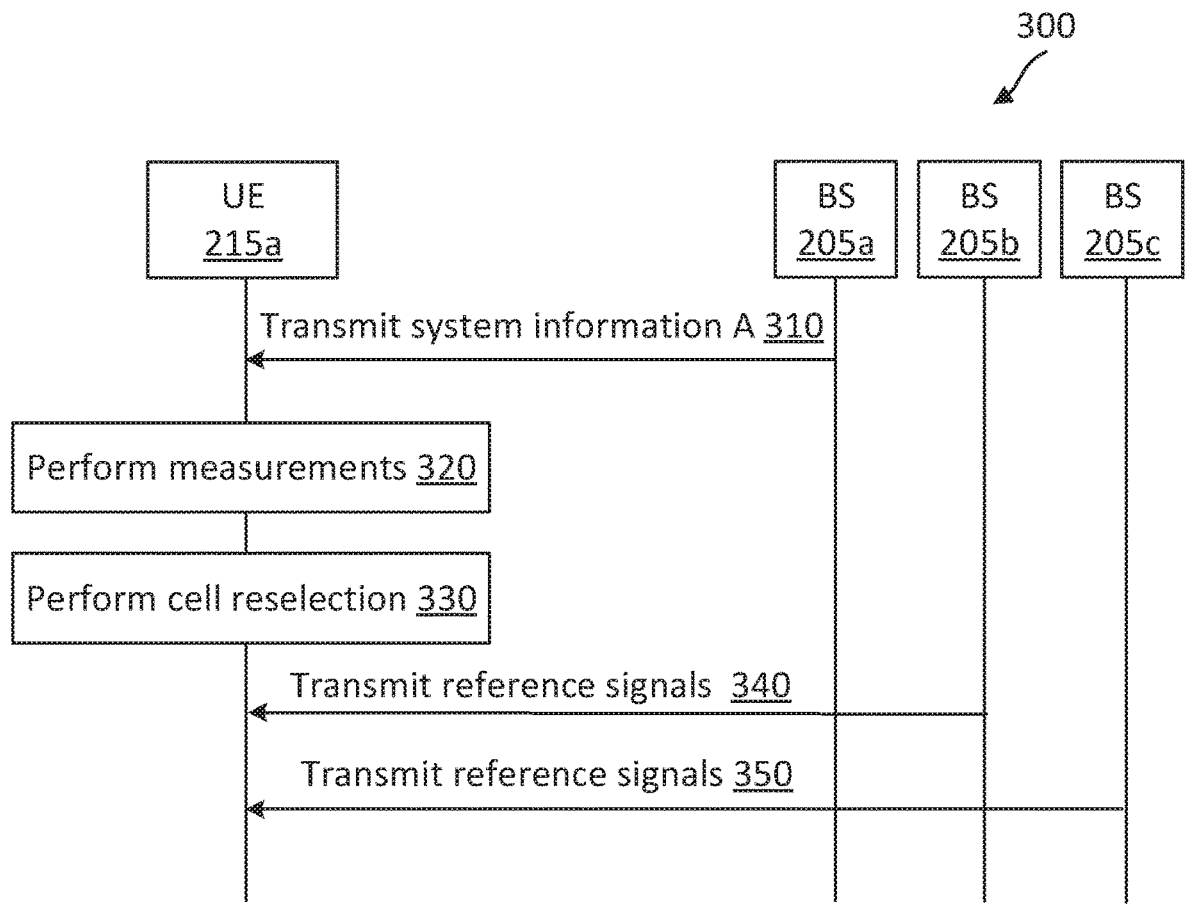
FIG. 3 is a signaling diagram illustrating a cell reselection method according to embodiments of the present disclosure.

FIGS. 2 and 3 illustrate a cell reselection scenario. FIG. 2 illustrates a wireless communication network 200 according to some embodiments of the present disclosure. The network 200 may correspond to a portion of the network 100. FIG. 2 illustrates three BSs 205 (individually labeled as 205a, 205b, and 205c), three cells 210 (individually labeled as 210a, 210b, and 210c), and one UE 215 for purposes of simplicity of discussion, though it will be recognized that embodiments of the present disclosure may scale to many more UEs 215 and/or BSs 205. The BSs 205 are similar to the BSs 105. The UE 215 is similar to the UEs 115.

The BS 205a provides service in a coverage area or cell 210a. The BS 205b provides service in a coverage area or cell 210b. The BS 205c provides service in a coverage area or cell 210c. In some examples, the BSs 205a, 205b, and 205c serve the cells 210a, 210b, and 210c, respectively, over different carrier frequencies. In some examples, the BSs 205a, 205b, and 205c serve the cells 210a, 210b, and 210c, respectively, over the same carrier frequency. In some examples, the BSs 205a, 205b, and 205c serve the cells 210a, 210b, and 210c, respectively, using different RATs. In some examples, the BSs 205a, 205b, and 205c serve the cells 210a, 210b, and 210c, respectively, using different RATs.

As an example, at time T1, the UE 215 is activated when the UE 215 is in the coverage of the cell 210a. The UE 215 performs an initial cell selection procedure and camp on the cell 210a based channel measurements and certain selection criteria. While camping on the cell 210a, the UE 215 may search for a better cell 210 to camp on, for example, due to mobility of the UE 215 (at time T2) as shown by the dashed arrow. Mechanisms for performing cell reselection or mobility are described in greater detail herein.

FIG. 3 is a signaling diagram illustrating a cell reselection method 300 according to embodiments of the present disclosure. The method 300 is employed by the network 200. The method 300 is implemented by the UE 215 and the BSs 205a, 205b, and 205c. For example, the UE 215 is camped on the cell 210a. Steps of the method 300 can be executed by computing devices (e.g., a processor, processing circuit, and/or other suitable component) of the BS 205a, 205b, and 205c and the UE 215. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 310, the BS 205a transmits system information A associated with BS 205a and/or the cell 210a. The BS 205a may transmit the system information A in a broadcast mode periodically to enable a UE desiring to join the network 200 to perform cell selection and initial network access. In addition, the system information A enables a UE camped on the cell 210a to perform channel measurements and/or cell reselection.

The system information A may include SSBs, PSS, SSS, PBCH signals, MIBs, and/or various types of system information blocks (SIBs). For example, a SIB type one (SIB1) provides scheduling information and/or availability of other SIB types and/or information (e.g., public land mobile network (PLMN) information and/or cell barring information) that can guide a UE in performing cell selection. Some examples for the other SIB types may include a SIB type two (SIB2), a SIB type three (SIB3), a SIB type four (SIB4), and a SIB type five (SIB5). A SIB2 provides information for cell reselection that are common for inter-frequency cell reselection, intra-frequency cell reselection, and inter-radio access technology (RAT) cell reselection. For example, a SIB2 may include measurement thresholds for a UE to determine when to start searching for another cell, cell priorities for cell reselection, and/or various cell reselection criteria and/or thresholds. A SIB3 provides neighboring cell related information for intra-frequency cell reselection. For example, the SIB3 includes physical cell identifier (ID) information associated with an intra-frequency neighboring cell and/or corresponding criteria for cell reselection. A SIB4 provides neighboring cell related information for inter-frequency cell reselection. For example, the SIB4 includes physical cell ID, frequency carrier, frequency band, and/or beam information associated with an inter-frequency neighboring cell and/or corresponding criteria for cell reselection.

A SIB5 provides neighboring cell related information for inter-RAT cell reselection. For example, the SIB5 includes RAT, frequency carrier, frequency band, and/or beam information associated with an inter-RAT neighboring cell and/or corresponding criteria for cell reselection. An example of an inter-RAT cell reselection may include a UE camped on an NR cell and reselecting to camp on an LTE cell or camping. Alternatively, a UE camped on an LTE cell may reselect to camp on an NR cell. In some instances, an inter-RAT cell reselection may be based on UE's preferences.

In an example, when the cell 210b is an inter-frequency neighboring cell of the cell 210a, the SIB4 may include information to guide a UE 215 to reselect to the cell 210b. Alternatively, when the cell 210b is an intra-frequency neighboring cell of the cell 210a, the SIB3 may include information to guide a UE 215 to reselect to the cell 210b. Yet alternatively, when the cell 210b is an inter-RAT neighboring cell of the cell 210a, the SIB5 may include information to guide a UE 215 to reselect to the cell 210b.

At step 320, while camping on the cell 210a, the UE 215 performs channel measurements. For example, the UE 215 tunes to a channel frequency or carrier frequency of the camped cell 210a, receives a signal from the camped cell 210a on the channel frequency, and measures a receive signal quality or a received signal power of the signal (e.g., the periodic system information A) received from the BS 205a. The received signal may be a reference signal associated with the periodic system information A.

In an example, the received signal power may be a reference signal received power (RSRP) and the received signal quality may be a reference signal received quality (RSRQ). A reference signal may refer to a predetermined signal with pilot symbols located at certain frequency sub-carriers or resource elements. RSRP is an average signal power of a single reference signal resource element. RSRQ is defined as N×(RSRP/RSSI), where RSSI is an average of total power measured across OFDM symbols that carry a reference signal and N is the number of resource blocks over which RSSI is measured, where each resource block includes a group of consecutive resource elements or sub-carriers (e.g., about 12).

At step 330, the UE 215 performs a cell reselection. The UE 215 may autonomously make the cell camping decision. However, the list of cells that are qualified for reselection, the thresholds for beginning a cell search, and/or the cell evaluation parameters and/or the criteria for selecting a candidate cell are configured by the BS 205a through the system information A (e.g., including SIB2, SIB3, SIB4, and/or SIB5).

The UE 215 may start to search for another cell for camping when the measured received signal power and/or the received signal quality from the currently camped cell 210a falls below a certain threshold. In an example, SIB2 can include an s-IntraSearchP threshold, an s-IntraSearchQ threshold, an s-NonIntraSearchP threshold, and/or an s-NonIntraSearchQ threshold for beginning a cell search. When the received signal power of the currently camped cell falls below the s-IntraSearchP threshold and/or when the received signal quality of the currently camped cell falls below the s-IntraSearchQ threshold, the UE 215 may search and/or monitor for an intra-frequency candidate cell. Alternatively, when the received signal power of the currently camped cell falls below the s-NonIntraSearchP threshold and/or when the received signal quality of the currently camped cell falls below the s-NonIntraSearchQ threshold, the UE 215 may optionally search and/or monitor for an inter-frequency candidate cell with an equal or lower reselection priority than a priority of the serving frequency or an inter-RAT candidate cell with an equal or lower cell reselection priority than the serving frequency priority. In general, the UE 215 may search and/or monitor neighboring frequencies with a higher reselection priority than the serving frequency priority for cell reselection as described in greater detail herein.

During the search, the UE 215 may measure received signal power and/or received signal quality from the currently camped cell 210a and candidate cells (e.g., the cells 210b and 210c). For example, at step 340, the BS 205b transmits reference signals at certain intervals to facilitate signal measurements for cell selection and/or cell reselection. Similarly, at step 350, the BS 205c transmits reference signal at certain intervals to facilitate signal measurements for cell selection and/or cell reselection. The UE 215 may identify the candidate cells based on the signal measurements. For intra-frequency cell reselection, the UE 215 may identify an intra-frequency neighboring cell as a candidate when the intra-frequency neighboring cell has a receive signal strength better than the currently camped cell 210a by a certain amount (e.g., based on hysteresis and/or a ranking parameter). When the receive signal strength (e.g., the received signal power and/or the received signal quality) of a candidate cell remains better than the currently camped cell 210a by the certain amount for a reference time duration, the UE 215 selects to camp on the candidate cell. In an example, SIB2 can include a t-Reselection (e.g., $T_{reselection}$) timer parameter specifying the reference time duration and a Qhyst parameter for the determining that a candidate cell has a better receive signal strength than the currently camped cell. SIB3 can include QOffset parameters for ranking intra-frequency cells.

For inter-frequency cell reselection and/or inter-RAT cell reselection, the UE 215 may select to camp on a cell with a higher reselection priority than the currently camped cell. The UE 215 may identify an inter-frequency neighboring cell or an inter-RAT neighboring cell as a candidate when the inter-frequency neighboring cell or the inter-RAT neighboring cell has a receive signal strength satisfying a threshold. When the receive signal strength (e.g., the received signal power and/or the received signal quality) of a candidate cell satisfy a threshold for a reference time duration, the UE 215 selects to camp on the candidate cell. In an example, SIB4 can include a set of cell reselection parameters for each carrier frequency. The set of cell reselection parameters can include a threshX-LowQ threshold, a threshX-LowP threshold, a threshX-HighQ threshold, and/or a threshX-HighP threshold for triggering a new inter-frequency cell to be reselected, a t-Reselection timer parameter for the reference time duration, and/or a cell reselection priority (e.g., an absolute priority) for a corresponding carrier frequency. In an example, SIB5 can include a set of cell reselection parameters for each RAT (e.g., NR or LTE). The set of cell reselection parameters can include a threshX-LowQ threshold, a threshX-Low threshold, a threshX-HighQ threshold, and/or a threshX-High threshold for triggering a new inter-RAT cell to be reselected, a QHyst parameter for the hysteresis, a t-Reselection timer parameter for the reference time duration, and/or a cell reselection priority (e.g., an absolute priority) for a corresponding RAT.

In some examples, the cell reselection parameters can be arranged in SIB2, SIB3, SIB4, and/or SIB5 as described in the 3GPP document TS 38.331 Release 15, titled "3$^{rd}$ Generation Partnership Project; Technical Specification Group Radio Access Network; NR; Radio Resource Control (RRC) protocol specification," Sep. 26, 2018, which is incorporated herein by reference. In general, the cell reselection parameters can be organized in any suitable arrangement and/or format for system information broadcast.

In an example, when the UE 215 identifies a candidate cell for cell reselection evaluation, the UE 215 may start a cell reselection timer. The UE 215 may configure an evaluation duration for timer based on a reference duration (e.g., t-Reselection time parameter) configured by the system information A. While the timer is running, the UE 215 may continue to monitor and/or evaluate signal measurements of the candidate cell. When the UE 215 detects that a signal measurement of the candidate cell falls below a threshold, the UE 215 stops the timer and aborts the evaluation for the candidate cell. Otherwise, when the timer expires, the UE 215 may select the candidate cell for camping. While the timer-based evaluation approach may allow the UE 215 to select a suitable cell for camping, the timer-based evaluation approach can cause a race condition where the UE 215 may select a candidate cell with an earliest expired reselection timer (e.g., an earliest evaluation completion time).

The selecting of a candidate cell with an earliest evaluation completion time can cause unnecessary cell reselection. As described above, for inter-frequency and/or intra-frequency cell reselection, a network may configure different cell selection priorities for different carrier frequencies and may configure a UE to select to a higher priority layer or a cell on a higher priority frequency than a currently camped cell. The network may assign the frequency priorities and/or cell reselection criteria to encourage the UE to select to a certain frequency. For example, the network may configure a lower cell reselection threshold and/or shorter evaluation duration for a higher priority layer than a lower priority layer. The timer-based approach can cause the UE to select to an earliest qualified candidate cell (e.g., cell A) with a frequency priority higher than a frequency priority of the currently camped cell. However, the earliest qualified candidate cell may have a lower frequency priority than a later qualified candidate cell (e.g., cell B). Thus, the UE may select to camp on cell A and subsequently select to camp on cell B, causing an unnecessary cell reselection to cell A.

Similarly, the timer-based approach can cause unnecessary cell reselections in intra-frequency cell reselection. For example, a UE may select to an earliest qualified intra-frequency cell (e.g., cell A) for camping. However, the earliest qualified candidate cell may have a lower signal strength than a later qualified candidate cell (e.g., cell B). Thus, the UE may select to camp on cell A and subsequently select to camp on cell B, again causing an unnecessary cell reselection to cell A. The unnecessary cell reselections can cause wastage in UE power consumption and instability in an idle mode and/or an inactive mode.

Accordingly, the present disclosure provides techniques to reduce the occurrences of unnecessary cell reselections at a UE, which may in turn reduce UE power consumption, improve UE mobility performance in an idle mode and/or inactive mode, and/or improve user experiences.

Figure 4:
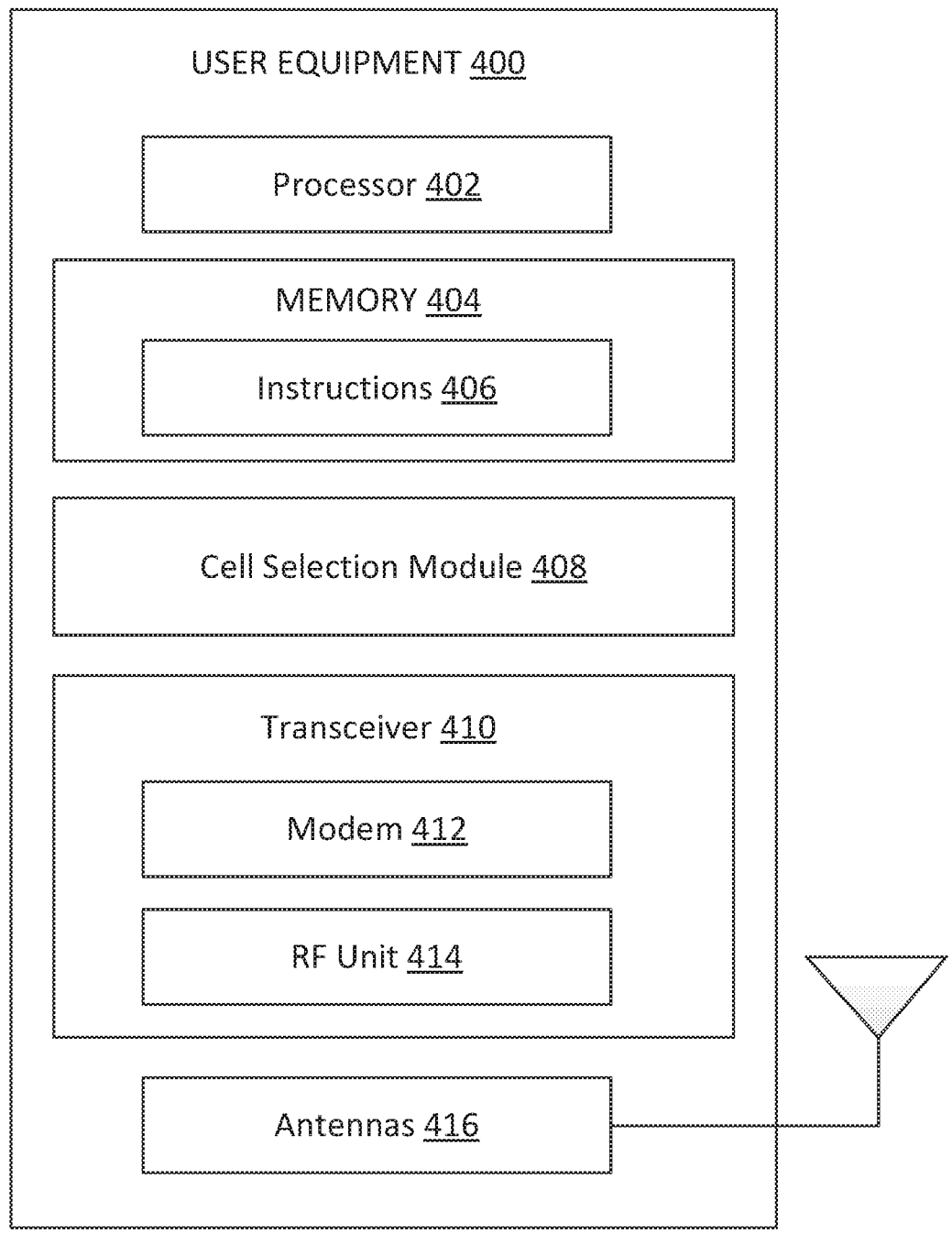
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 in the network 100 or a UE 215 in the network 200 as discussed above. As shown, the UE 400 may include a processor 402, a memory 404, a cell selection module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-13. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The cell selection module 408 may be implemented via hardware, software, or combinations thereof. For example, the cell selection module 408 may be implemented as a processor, circuit, and/or instructions 406 stored in the memory 404 and executed by the processor 402. In some examples, the cell selection module 408 can be integrated within the modem subsystem 412. In some examples, the cell selection module 408 may be implemented by a DSP within the modem subsystem 412. The cell selection module 408 may be used for various aspects of the present disclosure, for example, aspects of FIGS. 6, 7, 8, 9, 10, 11, 12A, 12B, and 13. The cell selection module 408 is configured to select an initial cell (e.g., the cell 110 or 210) for camping, acquire system information (MIB, SIBs, RMSI, OSI) from a BS (e.g., the BS 105 or 205) serving the selected cell, and/or perform cell reselection during an RRC idle mode and/or an RRC inactive mode. The system information may indicate one or more intra-frequency neighboring cells operating over the same carrier frequency as the selected cell, one or more inter-frequency neighboring carrier frequencies and neighboring cells operating over carrier frequencies different from the serving frequency, and/or one or more inter-RAT neighboring cells operating over carrier frequencies different from the serving frequency or on the same carrier frequency as the serving frequency. The system information may indicate a cell reselection priority for the selected cell and each neighboring carrier frequency. The system information may indicate cell reselection criteria (e.g., RSRP threshold, RSRQ threshold, and/or cell reselection evaluation timeout values) for each neighboring frequency and/or neighboring cell.

In an embodiment, the cell selection module 408 is configured to monitor and evaluate signal strengths (e.g., RSRPs and RSRQs) of inter-frequency candidate cells and/ or inter-RAT candidate cells for cell reselections, determine relative priorities among candidate cells, and/or configure timers and/or adjust timer configurations for evaluating the candidate cells based on the relative priorities to give priority to selection of a highest priority candidate cell. In an embodiment, the cell selection module 408 is configured to monitor and evaluate signal strengths (e.g., RSRPs and RSRQs) of intra-frequency candidate cells, configure a timer for evaluating each candidate cell, perform a one-shot signal measurement (e.g., RSRP or RSRQ) for each candidate cell upon an expiration of a cell reselection timer (e.g., corresponding to a cell A), identify a subset of candidate cells having a stronger signal strength than cell A based on the one-shot measurements, and/or select a candidate cell with a strongest signal strength or a signal strength satisfying a signal threshold for a longest duration from the subset for camping. Mechanisms for performing cell reselections during an idle more or an inactive mode with a reduction in unnecessary cell reselections are described in greater detail herein.

As shown, the transceiver 410 may include the modem subsystem 412 and the RF unit 414. The transceiver 410 can be configured to communicate bi-directionally with other devices, such as the BS s 105. The modem subsystem 412 may be configured to modulate and/or encode the data from the memory 404, the cell selection module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement RATs.

Figure 5:
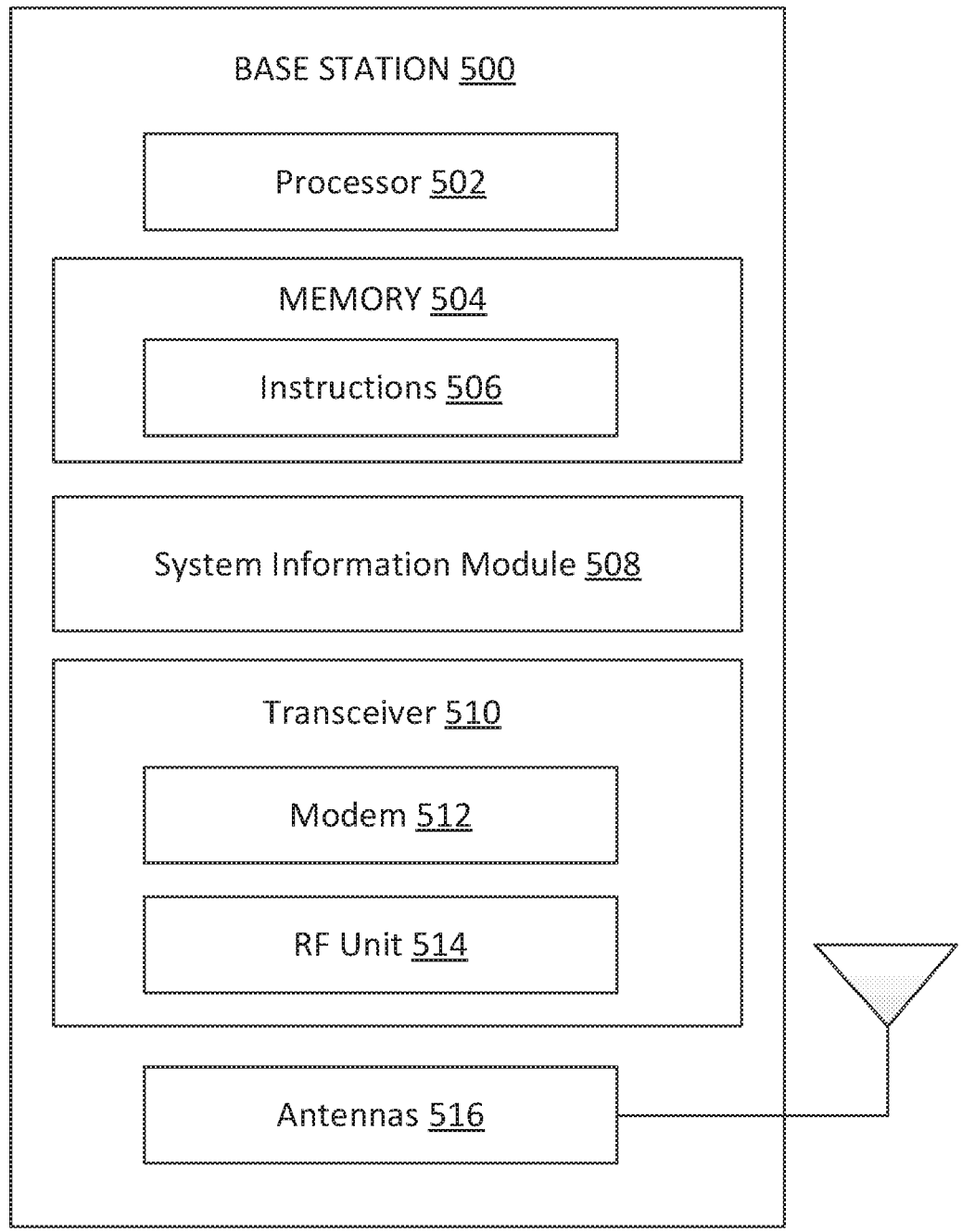
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 in the network 100 or a BS 205 in the network 200 as discussed above. A shown, the BS 500 may include a processor 502, a memory 504, a system information module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIG. 6-13. Instructions 506 may also be referred to as code, which may be interpreted broadly to include any type of computer-readable statement(s) as discussed above with respect to FIG. 4.

The system information module 508 may be implemented via hardware, software, or combinations thereof. For example, the system information module 508 may be implemented as a processor, circuit, and/or instructions 506 stored in the memory 504 and executed by the processor 502. In some examples, the system information module 508 may be implemented by a DSP within the modem subsystem 512. The system information module 508 may be used for various aspects of the present disclosure, for example, aspects of FIGS. 6, 7, 8, 9, 10, 11, 12, and 13. The system information module 508 is configured to transmit broadcast system information periodically according to certain schedules to enable a UE (e.g., the UEs 115, 215, and 400) to perform initial network access, cell selection, and/or reselection, as described in greater detail herein. The system information may indicate one or more intra-frequency neighboring cells operating over the same carrier frequency as the selected cell, one or more inter-frequency neighboring carrier frequencies and neighboring cells operating over carrier frequencies different from the serving frequency, and/or one or more inter-RAT neighboring cells operating over carrier frequencies different from the serving frequency or on the same carrier frequency as the serving frequency. The system information may indicate a cell reselection priority for the selected cell and each neighboring carrier frequency. The system information may indicate cell reselection criteria (e.g., RSRP threshold, RSRQ threshold, and/or cell reselection evaluation timeout values) for each neighboring frequency and/or neighboring cell.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115, 215, or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 500 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement RATs.

FIGS. 6-9 illustrate various mechanisms for reducing unnecessary inter-frequency and/or inter-RAT cell reselections in a network (e.g., the networks 100 and 200) when multiple inter-frequency and/or inter-RAT candidate cells (e.g., the cells 110 and 210) are available for selection. At a high level, a UE (e.g., the UE 115, 215, or 400) may configure preferences to reselect to a candidate cell having a relatively higher cell reselection priority than other candidate cells. The UE may configure timers for evaluating signal strengths of candidate cells based on relative cell reselection priorities among the candidate cells. The UE may configure a timer for evaluating a candidate cell of a highest cell reselection priority among all candidate cells with an evaluation duration based on a reselection timer parameter configured by the network, but may extend the timer evaluation duration for a candidate cell with a lower cell reselection priority. In other words, the UE delays the evaluation completion time for lower cell reselection priority candidate cells so that the highest-priority cell can be given priority for the cell reselection. Accordingly, a low cell reselection priority cell is preempted by a high cell reselection priority cell for cell selection. When camping on a highest-priority cell fails, the UE may arrange the available candidate cells based on the priorities of the candidate cells and select a next highest cell reselection priority cell from among the remaining candidate cells for camping. Further, a UE may limit or restrict the amount of time allowable for cell selection preemption. For example, when the UE continues to identify new candidate cells with a higher cell reselection priority than current candidate cells, but without selecting any candidate cell for camping, the UE may terminate the cell selection preemption process and select a highest-priority cell satisfying a reselection condition for camping.

Figure 6:
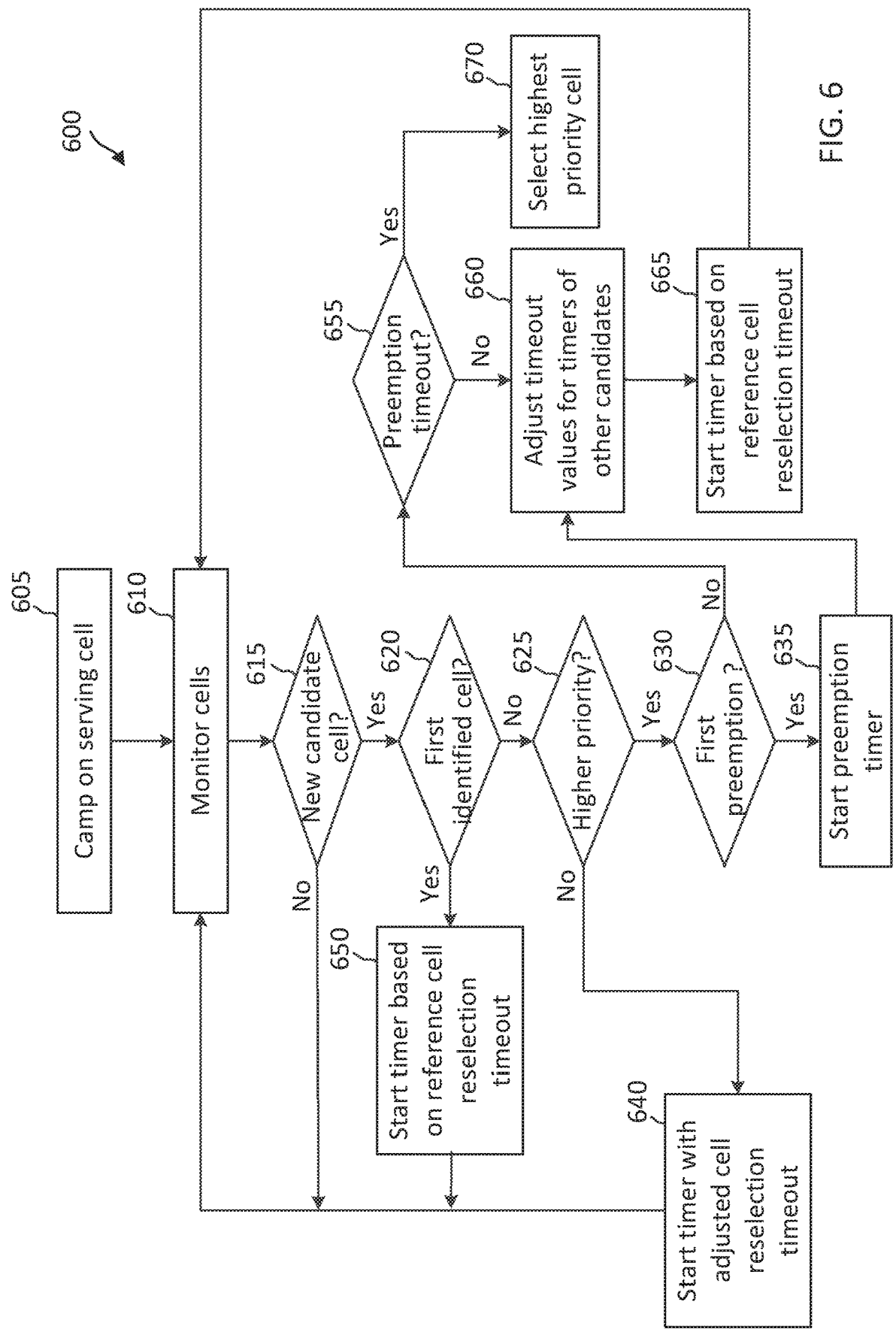
FIG. 6 is a flow diagram of an inter-frequency and/or inter-radio access technology (inter-RAT) cell reselection method according to some embodiments of the present disclosure.

FIG. 6 is a flow diagram of an inter-frequency and/or inter-RAT cell reselection timer configuration method 600 according to some embodiments of the present disclosure. Steps of the method 600 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the transceiver 410, the modem 412, and the one or more antennas 416, to execute the steps of method 600. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 605, the method 600 includes camping on a serving cell. The serving cell may operate over a certain carrier frequency (e.g., F1). The network may assign an absolute cell reselection priority for the serving carrier frequency, an absolute cell reselection priority for each inter-frequency carrier frequency, and an absolute cell reselection priority for each inter-RAT carrier frequency. The cell reselection priorities may also be referred to as frequency priorities or simply priorities. In some examples, an inter-frequency carrier frequency may have the same priority as the serving carrier frequency or a different priority than the serving carrier frequency, while an inter-RAT carrier frequency may always have a different priority than the serving carrier frequency. The serving cell may broadcast system information including cell reselection parameters as described above in the method 300 with respect to FIG. 3.

At step 610, the method 600 includes monitoring the signal strength of the serving cell and neighboring cells. The monitoring can include measuring received signal power and/or quality of signals of the serving cell. When the signal strength or measurements of the serving cell fall below a certain threshold, the UE may start to search for an inter-frequency candidate cell or an inter-RAT candidate cell. The threshold for starting the inter-frequency/inter-RAT candidate cell search may be provided by the system information (e.g., s-NonIntraSearchQ, s-NonIntraSearchP) or any suitable threshold. The UE can start monitoring signal strengths (e.g., received signal power and/or received signal quality) of neighboring frequencies and/or cells provided by the broadcast system information.

At step 615, the method 600 includes determining whether a new candidate cell is identified based on the monitoring. The UE may identify a neighboring cell as a candidate cell when a signal measurement of the neighboring cell satisfies a certain threshold, which may be provided by the system information (e.g., threshX-highQ and/or a threshX-highP) or any suitable threshold. When no candidate cell is identified, the method 600 returns to step 610 and continues with the monitoring. Otherwise, the method 600 proceeds to step 620.

At step 620, the method 600 includes determining whether the new candidate cell is a first candidate cell identified for reselection evaluation. When determining that the new candidate cell is a first candidate cell identified for reselection evaluation, the method 600 proceeds to step 650. At step 650, the method 600 includes starting a timer for evaluating the signal strength of the new candidate cell. The UE may configure the timer to expire based on a reference cell reselection timeout, which may be provided by the system information (e.g., a t-Reselection) or any suitable cell reselection timeout value. After starting the timer, the method 600 returns to the step 610 and continues with the monitoring and/or evaluation.

Returning to the step 620, when the new candidate is not a first candidate identified for reselection evaluation, the method 600 proceeds to step 625. At step 625, the method 600 includes determining whether the new candidate cell has a higher priority than other candidate cells that are under evaluations (e.g., with an ongoing timer). When determining that the new candidate cell has a higher priority than the other candidate cells, the method 600 proceeds to step 630.

At step 630, the method 600 determines whether a first selection preemption is to be performed due to the new identified high-priority candidate cell. As described above, a high-priority cell can preempt a low-priority cell for cell selection. When determining that a first selection preemption is to be performed, the method 600 proceeds to step 635.

At step 635, the method 600 includes starting a preemption timer, for example, with an expiration of about 10 seconds. The preemption timer is different than the timers discussed elsewhere which are candidate cell specific timers. For example, the candidate cell specific timers track the amount of time the signal strength of a candidate cell is measured to be above a threshold signal strength. The preemption timer functions to limit the amount of time spent in the selection preemption process without selecting any cell.

At step 660, the method 600 includes adjusting the timeout values for the timers that were previously started for evaluating the other candidate cells with a lower priority than the new candidate cell. The UE may extend the evaluation durations for timers of the low priority candidate cells to be beyond the cell reselection timeout for the new candidate cell. In an example, the UE may extend the evaluation duration of the timers up to about 7 seconds. Alternatively, the UE may extend the evaluation duration to an infinite duration (e.g., never expires). With the extended evaluation durations, the UE may continue to evaluate signal strengths of the low priority candidate cells, but may provide an opportunity for the new candidate cell with the highest priority to be selected before a lower priority candidate cell.

At step 665, the method 600 includes starting a timer for evaluating the signal strength of the new candidate cell based on a cell reselection timeout, for example, preconfigured for a carrier frequency of the new candidate cell. After starting the timer for the new candidate cell and adjusting the timers for the other candidate cells, the method 600 returns to the step 610 and continues with the monitoring.

Returning to the step 625, when determining that the new candidate cell does not have a higher priority than all available candidate cells, the method 600 proceeds to step 640. At step 640, the method 600 includes starting a timer for evaluating the signal strength of the new candidate cell based on an adjusted cell reselection timeout. For example, the UE may configure the timer with an evaluation duration longer than a cell reselection timeout preconfigured for a carrier frequency of the new candidate cell.

Returning to the step 630, when determining that a selection preemption due to the new candidate cell is not a first selection preemption for the preemption process, the method 600 proceeds to step 655. At step 655, the method 600 includes determining whether the preemption timer expires or timeouts. When determining that the preemption timer is not timeout, the method 600 proceeds to step 660. Otherwise, the method 600 proceeds to step 670.

At step 670, the method 600 includes selecting a highest priority cell from the candidate cells that are under evaluation at the time when the preemption timer expires. In other words, when no cell has been selected for a duration of the preemption timer, the UE terminates the selection preemption process and selects the highest priority cell with a signal strength above a cell reselection evaluation threshold for, for example, a minimum evaluation duration. The use of the preemption timer can prevent the UE from entering an indefinite loop of preemption while no actual reselection occurs.

Figure 7:
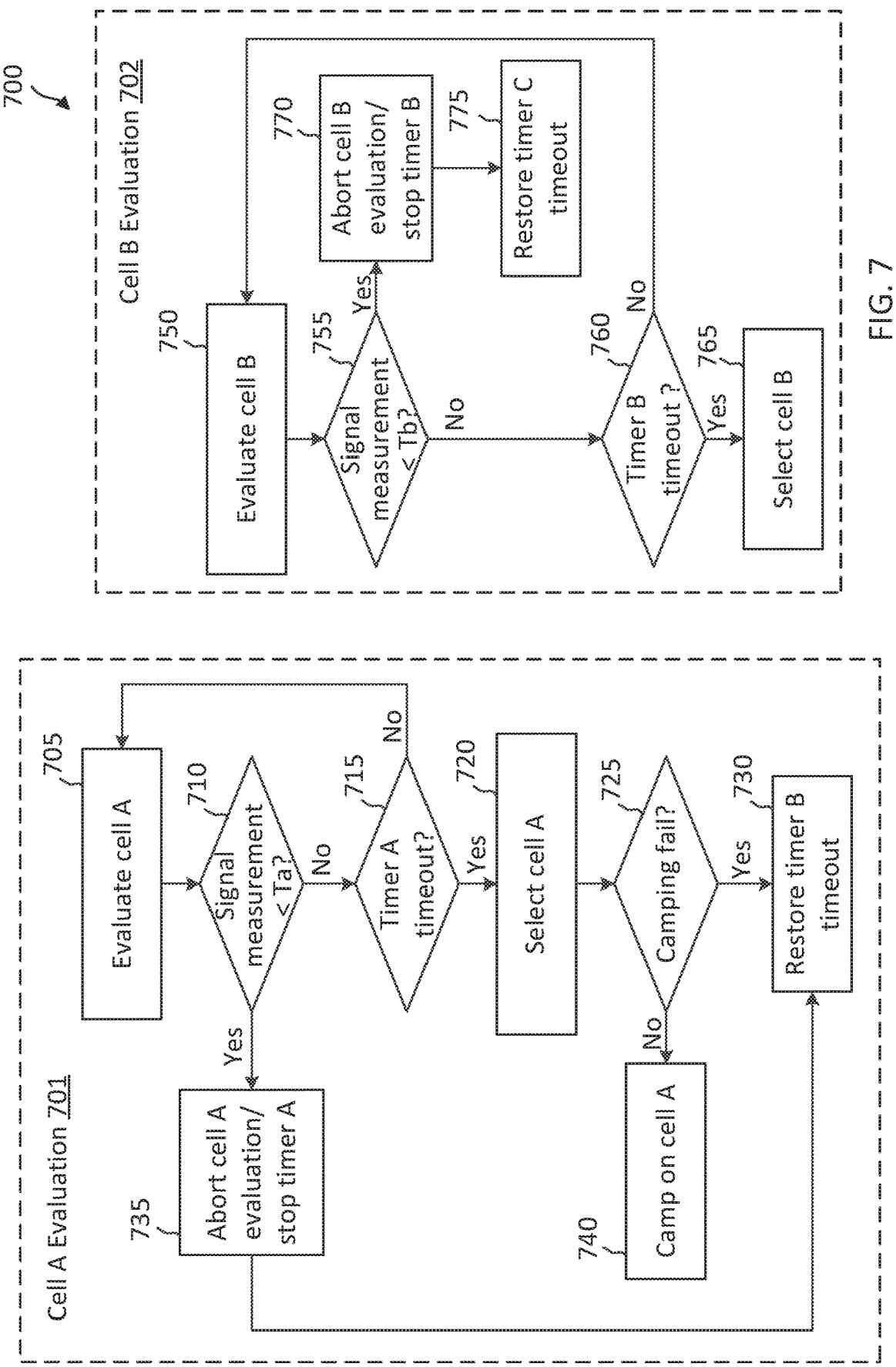
FIG. 7 is a flow diagram of an inter-frequency and/or inter-RAT cell reselection method according to some embodiments of the present disclosure.

FIG. 7 is a flow diagram of an inter-frequency and/or inter-RAT cell reselection timer configuration method 700 according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the transceiver 410, the modem 412, and the one or more antennas 416, to execute the steps of method 700. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 can be used in conjunction with the method 600. The method 700 provides a more detailed view of the cell evaluation, selection, and camping process in the method 600. For example, a UE may employ the method 600 to configure timers for evaluating candidate cells.

As an example, the UE identifies a list of candidate cells for cell reselection evaluation. The list of candidate cells may include cell A, cell B, and cell C in a descending cell reselection priority order. Cell A may operate over a carrier frequency Fa, cell B may operate over a carrier frequency Fb, and cell C may operate over a carrier frequency Fc. Each carrier frequency may have a corresponding cell reselection criterion including a cell reselection signal threshold and a cell reselection timeout value. For example, cell A may have a cell reselection signal threshold represented by Ta and a preconfigured cell reselection timeout represented by Ra corresponding to Fa. Cell B may have a cell reselection selection threshold represented by Tb and a cell reselection timeout represented by Rb corresponding to Fb. Cell C may have a cell reselection signal threshold represented by Tc and a cell reselection timeout represented by Rc corresponding to Fc. In some instances, the parameters Ta, Tb, and Tc may have the same value. In other instances, the parameters Ta, Tb, and Tc may have different values. Similarly, in some instances, the parameters Ra, Rb, and Rc may have the same value. In other instances, the parameters Ra, Rb, and Rc may have different values. The parameters Ta, Ra, Tb, Rb, Tc, and Rc can be configured by a serving cell of the UE via broadcast system information. The UE may start a timer A for evaluating signal measurements of cell A (where timer A can be reset or will timeout after time Ra has passed), a timer B for evaluating signal measurements of cell B (where timer B can be reset or will timeout after time Rb has passed), and a timer C (where timer C can be reset or will timeout after time Rc has passed) for evaluating signal measurements of cell C. The UE may configure timer A with a timeout value corresponding to a cell reselection timeout parameter Ra for cell A's carrier frequency. In the method 700, the UE may extend the timeouts or expiration duration of the timers B and C for the low cell reselection priority cells B and C, respectively, for example, by configuring the timers B and C with a large timeout value (e.g., larger than the timeout value of cell A or an infinity timeout value). The method 700 begins after a UE started timer A, time B, and timer C for evaluating cell A, cell B, and cell C, respectively, for example, using the method 600. In other words, the UE may concurrently evaluate cell A, cell B, and cell C. For simplicity of discussion and illustration, FIG. 7 illustrates cell A evaluation 701 and cell B evaluation 702. However, cell C evaluation may be substantially similar to the cell B evaluation 702 while the cell A evaluation 701 and the cell B evaluation 702 are in progress. In general, a UE may evaluate any suitable number of candidate cells (e.g., about 1, 2, 3, or 4 or more) at any given time with the highest-priority cell being evaluated as shown by the cell A evaluation 701 and the other lower-priority cells being evaluated as shown by the cell B evaluation 702.

At step 705, the method 700 includes evaluating signal measurements (e.g., RSRPs and/or RSRQs) of cell A while timer A is in progress.

At step 710, the method 700 includes determining whether a signal measurement of cell A falls below the threshold Ta during the evaluation. When determining that a signal measurement of cell A falls below the threshold Ta, the method 700 proceeds to step 735.

At step 735, upon detecting a signal measurement of cell A falls below the threshold Ta, the method 700 includes aborting cell A evaluation (e.g., excluding cell A from the list of candidate cells) and stopping timer A. After aborting the evaluation of cell A and stopping timer A, the method proceeds to step 730.

At step 730, the method 700 includes restoring timer B based on cell B being a next highest priority among the candidate cells (e.g., cells B and C). As described above, the UE extends the expiration period of the timer B based on cell A having a higher frequency priority than cell B. The UE may start the timer B and evaluate cell B while evaluation of cell A is ongoing. The timer B with the extended expiration period prevents the lower-priority cell B from being selected. To restore the time B, the UE may determine an elapsed duration since the time B has started and update the expiration or timeout value for timer B based on a difference between the elapsed duration and the reference cell reselection timeout value Rb for cell B.

As an example, the reference cell reselection timeout value Rb may be about 3 seconds. The timer B may have been extended to about 5 seconds. The cell B may have been under evaluation for about 2 seconds (e.g., the elapsed duration) at the time when the timer B is to be restored. Thus, the timer B may be updated to have a remaining expiration period of about 1 second to complete 3 second of evaluation. After restoring time B, the method 700 may continue to evaluate the signal strengths of cell B and/or cell C as described in greater detail herein.

In some other instances, at the time when timer B is to be restored, the elapsed duration for timer B may exceed the reference cell reselection timeout value Rb. Thus, the UE may immediately select cell B for camping and stop timer B. Referring to the same example discussed above where the reference cell reselection timeout value Rb may be about 3 seconds and the timer B may have been extended to about 5 seconds. If cell B has been under evaluation for about 4 seconds (e.g., the elapsed duration) at the time when timer B is to be restored, the UE may immediately select cell B for camping.

Returning to step 710, when determining that a signal measurement of cell A is above the threshold Ta, the method 700 proceeds to step 715. At step 715, the method 700 includes determining whether timer A expires or after time Ra passes. When determining that timer A expires, the method 700 proceeds to step 720. Otherwise, the method 700 returns to step 705 and continues to evaluate cell A. The expiration of timer A indicates that the evaluation of cell A's signal strength has completed (and that the signal strength of cell A has been above a corresponding threshold for at least an evaluation time duration for cell A).

At step 720, upon timer A's timeout, the method 700 includes selecting cell A for camping. After selecting cell A, the UE may start the camping process by acquiring system information from cell A.

At step 725, the method 700 includes determining whether camping on cell A fails. The camping failure may be due to a system information decoding failure, cell A being a barred cell where camping by the UE is not allowed, or cell A belonging to a forbidden PLMN where the UE may not be allowed to access. When determining that camping on cell is successful, the method 700 proceeds to step 740.

At step 740, the method 700 camps on cell A. In other words, cell A becomes the serving cell for the UE. After camping on cell A, the UE may repeat the cell monitoring, evaluation, and reselection process using the methods 600 and 700.

Returning to step 725, when determining that the camping on cell A fails, the method 700 proceeds to step 730 to restore timer B (e.g., the timer for evaluating a next highest priority cell).

As described above, the UE evaluates cell A, cell B, and cell C concurrently, where the evaluation duration for each cell A, cell B, and cell C are tracked using timer A (configured with an expiration of Ra), the extended timer B, and extended timer C, respectively. At step 750, the method 700 includes evaluating the signal strength of cell B using similar mechanisms as for the evaluation of cell A. As shown, at step 755, the method 700 includes determining whether a signal measurement of cell B falls below the threshold Tb during or over the evaluation time duration. When determining that a signal measurement of cell B falls below the threshold Tb, the method 700 proceeds to step 770.

At step 770, the method 700 includes aborting the evaluation of cell B and stopping timer B.

At step 775, after aborting the evaluation of cell B and stopping timer B, the method 700 includes restoring timer C based on cell C being a next highest priority candidate cell using similar mechanisms as restoring the time B at step 630.

Returning to the step 755, when determining that a signal measurement of cell B is above the threshold Tb, the method 700 proceeds to step 760.

At step 760, the method 700 includes determining whether timer B expires or timeouts. When determining that timer B expires or timeouts indicating that the evaluation of cell B is successfully completed (and that the signal strength of cell B has been above a corresponding threshold for at least an evaluation time duration for cell B), the method 700 proceeds to step 765. Otherwise, the method 700 returns to step 750 to continue the evaluation of cell B.

At step 765, the method 700 includes selecting cell B for camping. After selecting cell B for camping, the method 700 may employ similar system information acquisition and/or cell camping failure detection mechanisms discussed above for the selection of cell A. In other words, when system information is successfully decoded from cell B and cell B is not a barred cell or does not belong to a forbidden PLMN, the UE may proceed to camp on cell B. Otherwise, the UE may restore a timer (e.g., timer C) of a next highest priority candidate cell (e.g., cell C). It should be noted that while the evaluation of cell C is not shown in FIG. 7, the method 700 may evaluate cell C using similar mechanisms as for the evaluations of cell A and/or cell B and may select cell C after timer C is restored at step 775. For example, the UE may select cell C after the evaluation of C is completed or immediately if the cell C evaluation satisfies the duration Rc at the time of the timer C restoration.

Figure 8:
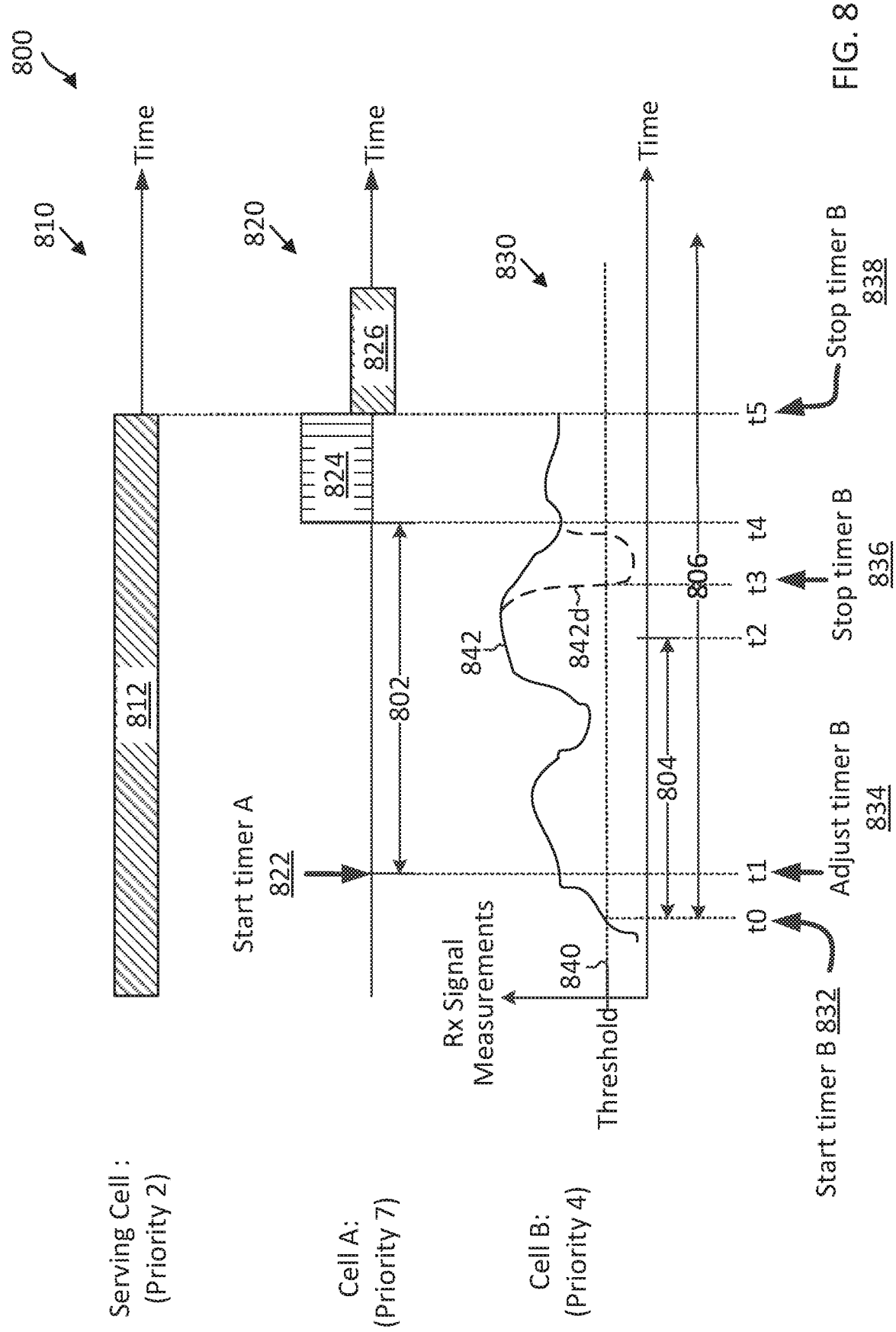
FIG. 8 illustrates an inter-frequency and/or inter-RAT cell reselection scenario according to some embodiments of the present disclosure.

FIG. 8 illustrates an inter-frequency and/or inter-RAT cell reselection scenario 800 according to some embodiments of the present disclosure. The scenario 800 may correspond to a cell reselection scenario of a UE, such as a UE 115, 215, or 400, in a network, such as the network 100 or 200, implementing the methods 600 and/or 700. The scenario 800 shows a UE camping on a serving cell as shown by 812 and identifying two candidate cells, a cell A and a cell B. The serving cell may operate on a frequency having a priority of 2, cell A may operate on a frequency having a priority of 7, and cell B may operate on a frequency having a priority of 4, where a higher number represents a higher cell reselection priority. In FIG. 8, the x-axes represent time in some constant units. FIG. 8 includes timelines 810 and 820 illustrating cell evaluation and/or selection activities of the UE on the serving cell and cell A, respectively. FIG. 8 further includes a signal profile 830. The y-axis for the signal profile 830 represents the receive (Rx) signal measurements (e.g., RSRP or RSRQ) in some constant units. The signal profile 830 illustrates receive signal measurements 842 for cell B over time measured by the UE camping on the serving cell.

At time t0, the UE detects that the signal measurements 842 of cell B is above a cell reselection signal threshold 840 (e.g., corresponding to the carrier frequency of cell B). Thus, the UE identifies cell B as a candidate cell for cell reselection evaluation. After identifying cell B as a candidate cell, the UE starts a timer B for cell B evaluation as shown by 832. The UE may configure timer B with an evaluation duration 804 (e.g., corresponding to a cell reselection timeout of the carrier frequency of cell B).

At time t1, the UE determines that the signal measurement of cell A is above a cell reselection signal threshold (e.g., corresponding to the carrier frequency where cell A operates on). Thus, the UE identifies cell A as a candidate cell for cell reselection evaluation. After identifying cell A as a candidate cell, the UE starts a timer A for cell A evaluation as shown by 822. The UE may configure timer A with an evaluation duration 802 (e.g., corresponding to a cell reselection timeout of the carrier frequency of cell A). Since cell A has a higher cell reselection priority than cell B, the UE may reconfigure or adjust timer B with an extended evaluation duration 806 as shown by 834. The evaluation duration 806 may be extended beyond an expiration time of timer A. In some examples, the UE may reconfigure timer B with a large timeout value (e.g., an infinite duration) such that timer B expires after timer A.

At time t4, timer A expires indicating that the signal strength of cell A stays above the required cell reselection signal threshold 840 for the evaluation duration 802. Thus, the UE may select cell A for camping. After selecting cell A, the UE performs system information acquisition and decoding as shown by 824.

At time t5, upon completing the system information acquisition and decoding and checking that cell A is suitable for camping (e.g., cell A is not a barred cell and does not belong to a forbidden PLMN), the UE switches to camp on cell A as shown by 826. After successfully camping on cell A, the UE may stop timer B as shown by 838.

The UE may continue to evaluate cell B signal measurements 842 after extending cell B timer expiration to the evaluation duration 806. In other words, the UE may evaluate signal measurements for both cell A and cell B during a cell reselection process. At any time during the evaluation, when cell B signal measurements 842 fall below the threshold 840 (e.g., at time t3) as shown by the dashed curve 842d, UE may abort the evaluation of cell B and stop timer B as shown by 836.

As can be observed, without the reconfiguration of timer B, timer B may expire at the end of the evaluation duration 804 (e.g., at time t2) before timer A expires and the UE may select the lower priority cell B. Accordingly, the reconfiguring or extending of timer B upon the detection of the high priority candidate cell A allows the UE to give priority to the higher priority cell A for the reselection.

Figure 9:
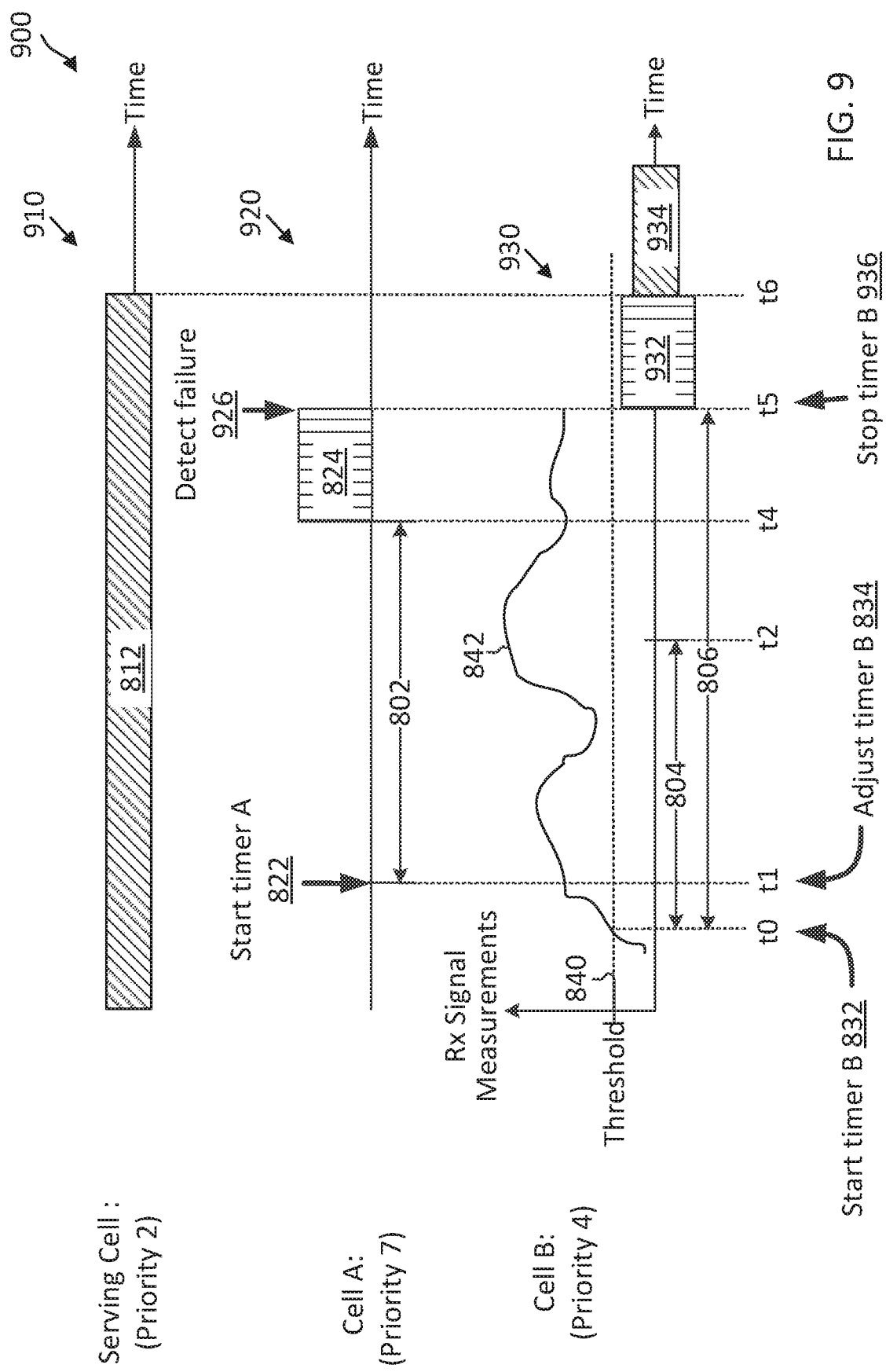
FIG. 9 illustrates an inter-frequency and/or inter-RAT cell reselection scenario according to some embodiments of the present disclosure.

FIG. 9 illustrates an inter-frequency and/or inter-RAT cell reselection scenario according to some embodiments of the present disclosure. The scenario 900 may correspond to a cell reselection scenario of a UE, such as a UE 115, 215, or 400, in a network, such as the network 100 or 200, implementing the methods 600 and/or 700. The scenario 900 is substantially similar to the scenario 800. However, the scenario 900 illustrates a scenario when camping on the higher priority cell A fails. In FIG. 9, the x-axis represents time in some constant units. FIG. 9 includes timelines 910 and 920 illustrating cell reselection activities of the UE on the serving cell and cell A, respectively. FIG. 9 further includes a signal profile 93. The y-axis for the signal profile 930 represents the Rx signal measurements (e.g., RSRP or RSRQ) in some constant units. The signal profile 930 illustrates Rx signal measurements 942 of cell B and additionally include cell reselection activities for cell B. The UE may employ similar cell evaluation and reselection mechanism as in the methods 600 and 700 and the scenario 800.

As shown in FIG. 9, the scenario 900 is similar to the scenario 800 until time t5. At time t5, the UE determines that camping on cell A fails as shown by the detection failure 926 instead of passes as in the scenario 800. Thus, the UE may evaluate the selection of a next highest priority candidate cell (e.g., cell B). The UE may determine whether cell B includes signal measurements 842 satisfying the threshold 840 for an evaluation duration longer than a cell reselection timeout (e.g., the evaluation duration 804) for cell B's frequency. When the UE determines that cell B satisfies the threshold 840 for a longer duration than the cell reselection timeout, the UE selects cell B for camping and stops timer B as shown by 936. After selecting cell B, the UE begins to acquire and decode system information from cell B as shown by 932.

At time t6, upon completing the camping process on cell B, the UE switches to camp on cell B as shown by 934.

During the evaluation of cell A in the evaluation duration 802, if the UE detects a signal measurement of cell A falling below a cell reselection signal threshold for cell A, the UE may abort the evaluation of cell A and stop timer A. The UE may restore timer B if timer B has not reached the evaluation duration 804 to allow cell B to be selected for camping upon a timeout of timer B. Otherwise, if an elapsed duration of timer B is longer than the evaluation duration 804, the UE may immediately select cell B for camping and stop timer B.

Figure 10:
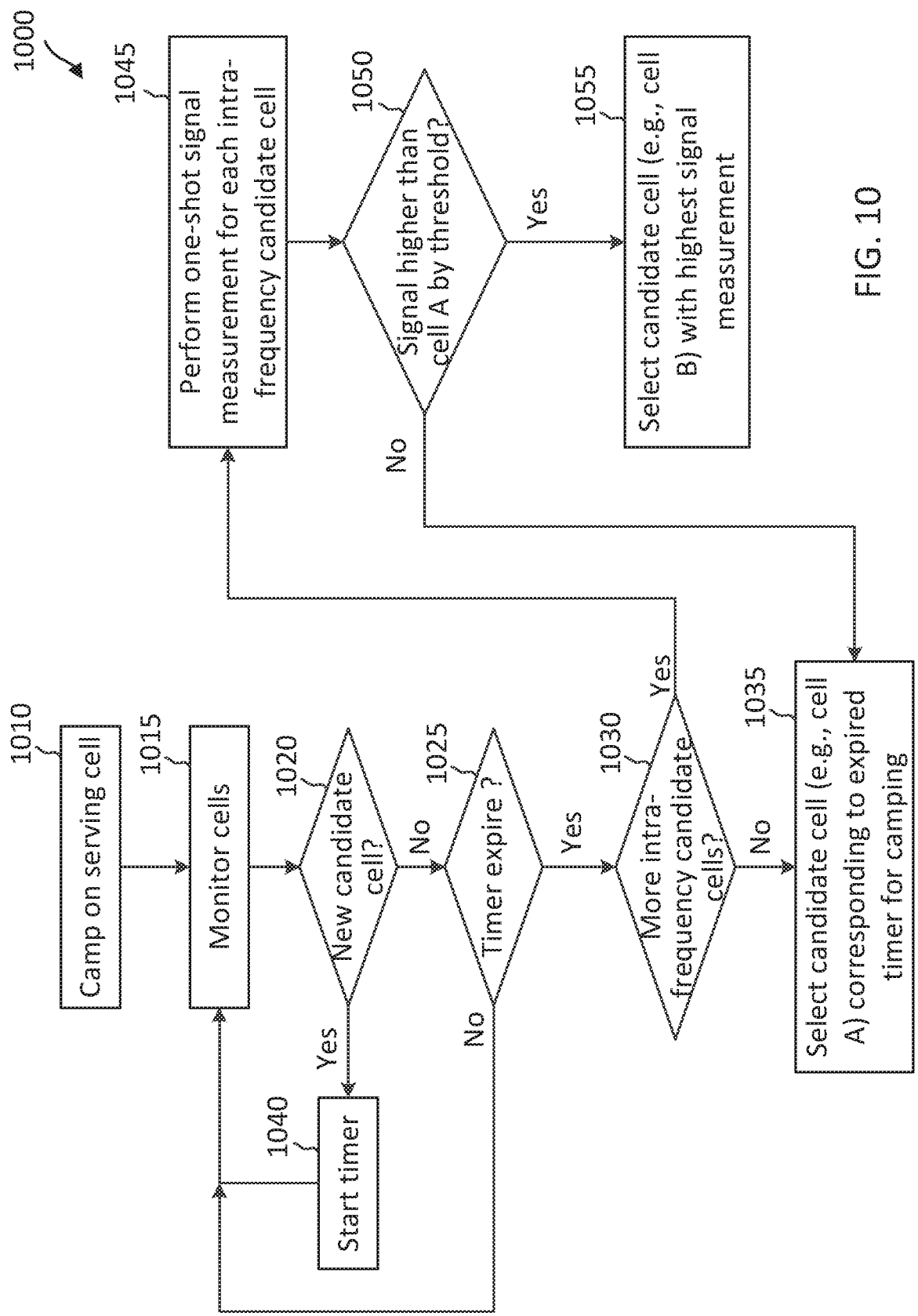
FIG. 10 is a flow diagram of an intra-frequency cell reselection method according to some embodiments of the present disclosure.
Figure 11:
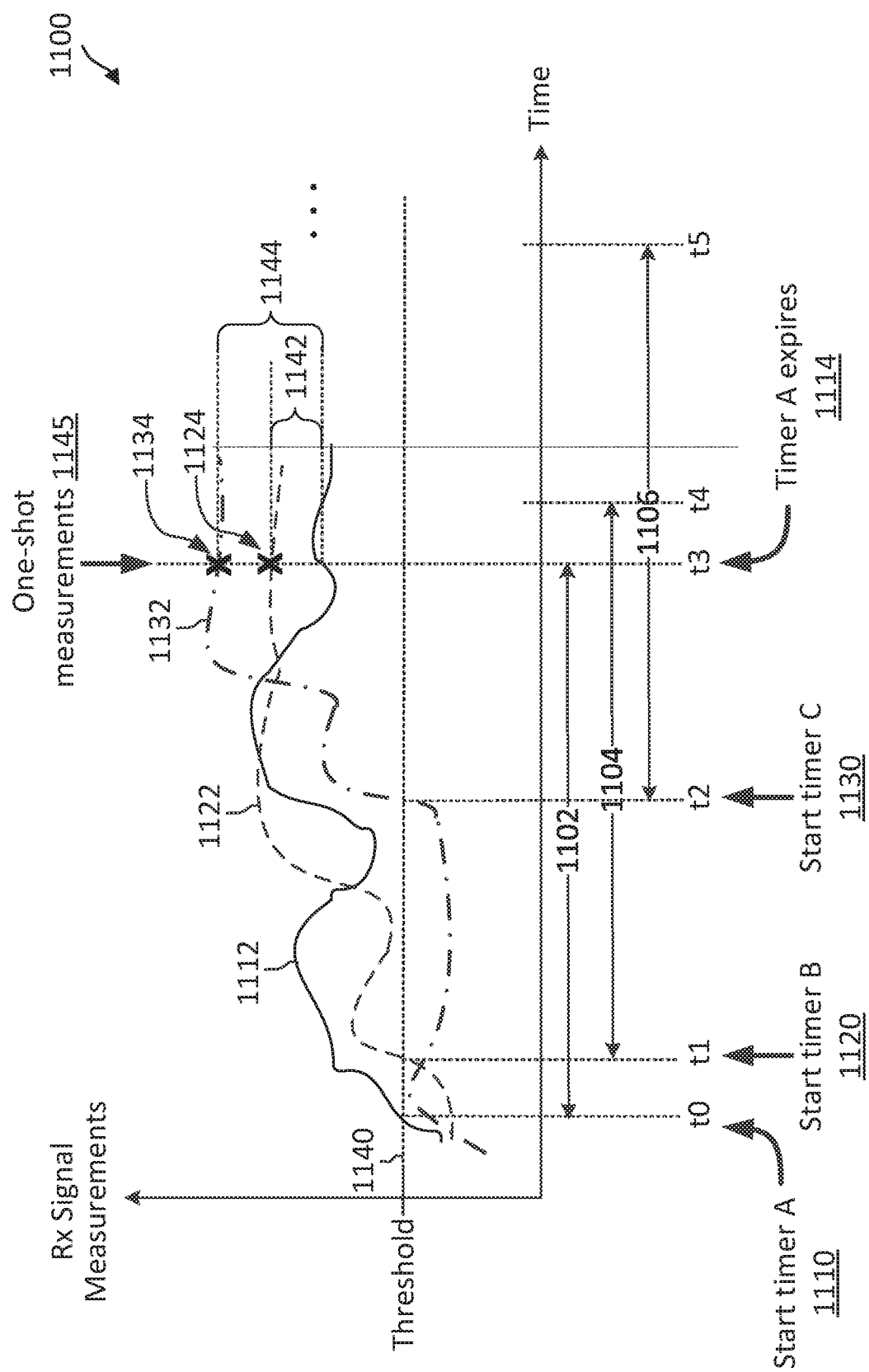
FIG. 11 illustrates an intra-frequency cell reselection scenario according to some embodiments of the present disclosure.

FIGS. 10-11 illustrate various mechanisms for reducing unnecessary intra-frequency cell reselections in a network (e.g., the networks 100 and 200) when multiple intra-frequency candidate cells (e.g., the cells 110 and 210) are available for selection.

FIG. 10 is a flow diagram of an intra-frequency cell reselection method 1000 according to some embodiments of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the transceiver 410, the modem 412, and the one or more antennas 416, to execute the steps of method 1000. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes camping on a serving cell. The serving cell may broadcast system information including cell reselection parameters as described above in the method 300 with respect to FIG. 3.

At step 1015, the method 1000 includes monitoring the signal strength of the serving cell and neighboring cells. The monitoring can include measuring received signal power and/or quality of signals of the serving cell. When the signal strength or measurements of the serving cell fall below a certain threshold, the UE may start to search for an intra-frequency candidate cell. The threshold for starting the intra-frequency candidate cell search may be provided by the system information (e.g., s-IntraSearchQ, s-IntraSearchP) or any suitable threshold. The UE can start monitoring signal strengths (e.g., received signal power and/or received signal quality) of intra-frequency neighboring cells provided by an intra-frequency neighboring cell list in the broadcast system information.

At step 1020, the method 1000 includes determining whether a new candidate cell is identified based on the monitoring. The UE may identify an intra-frequency neighboring cell as a candidate cell when a signal measurement of the cell satisfies a certain threshold. When a new candidate cell is identified, the method 1000 proceeds to step 1040.

At step 1040, the method 1000 includes starting a timer for evaluating the new candidate cell. The UE may configure the timer with an expiration duration based on a preconfigured cell reselection timeout, for example, provided by the system information or any suitable cell reselection timeout value.

Returning to step 1020, when no candidate cell is identified, the method 1000 proceeds to step 1025. At step 1025, the method 1000 determines whether any timer previously configured for evaluating a candidate cell expires. When no timer is expired, the method 1000 returns to step 1015 and continues with the monitoring. Otherwise, the method 1000 proceeds to step 1030. The expiration of a timer indicates that the evaluation for the candidate cell corresponding to the timer has been completed and is ready for reselection.

At step 1030, after detecting a timer expiration, the method 1000 includes determining whether there are more intra-frequency candidate cells available (e.g., under evaluation with an ongoing timer). For example, an intra-frequency candidate cell is considered as available when the signal strength of the intra-frequency candidate cell has been above a threshold throughout the time of its ongoing timer. When determining that there is no other intra-frequency candidate cell available at a first timer expiration time, the method 1000 proceeds to step 1035.

At step 1035, the method 1000 includes selecting the candidate cell (e.g., cell A or a first candidate cell) corresponding to the expired timer (timer A or a first timer) for camping. The expiration of the timer indicates that the candidate cell A has a signal strength satisfying a certain threshold for a certain evaluation duration. After selecting cell A, the UE may start to acquire system information from cell A.

Returning to step 1030, when determining that there is one or more intra-frequency candidate cell available at the first timer expiration time, the method 1000 proceeds to step 1045. At step 1045, the method 1000 include performing a one-shot signal measurement or an instantaneous measurement (e.g., RSRP or RSRQ) for each intra-frequency candidate cell.

At step 1050, the method 1000 includes determining whether any of the other intra-frequency candidate cell includes a signal measurement higher than cell A by a certain threshold. In other words, the UE may identify a subset of the intra-frequency candidate cells that has a signal measurement higher than cell A by a certain amount. The UE may identify an intra-frequency candidate cell for the subset when the signal strength of the intra-frequency candidate cell from the one-shot measurement and/or a latest measurement from the evaluation is greater than the signal strength of cell A by a certain amount, denoted as Delta_strength, shown below:

$$\text{Delta\_strength} = |Q_{offset}| + |Q_{hyst}|, \quad (1)$$

where $Q_{offset}$ represents an offset or bias value (e.g., in units of dB) for ranking the intra-frequency candidate cells and $Q_{hyst}$ represents a hysteresis value (e.g., in units of dB) to prevent reselections back and forth among cells. In an example, the $Q_{offset}$ and $Q_{hyst}$ parameters are provided by system information of the serving cell. In an example, each cell may be preconfigured with a corresponding $Q_{offset}$ parameter and/or a corresponding $Q_{hyst}$ parameter.

When determining that there is no intra-frequency candidate cell with a one-shot signal measurement greater than the signal strength of cell A by the amount shown in equation (1), the method 1000 proceeds to step 1035 to select cell A for camping. Otherwise, the method 1000 proceeds to step 1055.

At step 1055, the method 1000 includes selecting a candidate cell with a strongest signal strength or with a signal strength satisfying a threshold for a longest duration (i.e., the candidate cell has a timer running for the longest duration) from the subset for camping. For example, the subset of candidate cells may include cell B, cell C, cell D, and cell E and the selected cell may be cell B.

In an example, during the cell monitoring at step 1015, when the UE identifies any candidate cell under evaluation (e.g., with an ongoing timer) has a signal measurement falls below a corresponding threshold, the UE may abort the evaluation of the candidate cell and stop the timer for evaluating the cell.

In an example, after selecting a candidate cell (e.g., cell A or cell B) for camping, the UE may continue to monitor signal strengths of other candidate cells in the subset while acquiring system information from the selected cell. Upon a failure in camping on the selected cell, for example, due to MIB/SIB decoding failure, or the PLMN of the selected cell is forbidden, etc., the UE may immediately reselect a candidate cell with a strongest signal strength (e.g., based on a latest signal measurement) or a candidate cell (e.g., one of cell C, cell D, or cell E) with a signal strength satisfying a threshold for a longest duration (i.e., the candidate cell has a timer running for the longest duration) from the subset for camping.

FIG. 11 illustrates an intra-frequency reselection scenario 1100 according to some embodiments of the present disclosure. The scenario 1100 may correspond to a cell reselection scenario of a UE, such as a UE 115, 215, or 400, in a network, such as the network 100 or 200. The scenario 1100 shows a UE camping on a serving cell and identifying three intra-frequency candidate cells, a cell A, a cell B, and a cell C. In FIG. 11, the x-axis represents time in some constant units and the y-axis represents receive (Rx) signal measurements (e.g., RSRP or RSRQ) in some constant units. FIG. 11 shows signal measurements 1112, 1122, 1132 for cells A, B, and C, respectively, over time measured by the UE while camping on the serving cell. FIG. 11 illustrates a single cell reselection signal threshold 1140 for all three cells A, B, and C for purposes of simplicity of discussion only. However, in some instances, each cell may have a corresponding cell reselection signal threshold (e.g., based on a corresponding Qoffset parameter and Qhyst parameter as configured in SIBs).

At time t0, the UE detects that the signal measurement 1112 for cell A is above a cell reselection signal threshold 1140. Thus, the UE identifies cell A as a candidate cell for cell reselection evaluation and starts a timer A for cell A evaluation as shown by 1110. The UE may configure timer A with an evaluation duration 1102 (e.g., corresponding to a preconfigured cell reselection timeout for cell A), the evaluation duration 1102 ending at a first timer expiration time.

At time t1, the UE detects that the signal measurement 1122 for cell B is above the cell reselection signal threshold 1140. Thus, the UE starts a timer B for evaluating the signal strength of cell B signal as shown by 1120. The UE may configure timer B with an evaluation duration 1104 (e.g., corresponding to a preconfigured cell reselection timeout for cell B), such that timer B expires at time t4.

At time t2, the UE detects that the signal measurement 1132 for cell C is above the cell reselection signal threshold 1140. Thus, the UE starts a timer C for evaluating the signal strength of cell C as shown by 1130. The UE may configure timer C with an evaluation duration 1106 (e.g., corresponding to a preconfigured cell reselection timeout for cell C), such that timer C expires at time t5.

At time t3, timer A expires indicating that the signal strength of cell A has been consistently good (e.g., above the required cell reselection signal threshold) for the evaluation duration 1102. The UE performs one-shot signal measurements (e.g., RSRP or RSRQ) for the other identified candidate cells (e.g., cells B and C) as shown by 1145. The UE may identify a subset of the candidate cells based on equation (1) described above. For example, at time t3 when timer A expires, cell B has a one-shot signal measurement 1124 greater than the signal measurement 1114 of cell A by an amount 1142 satisfying equation (1). Similarly, cell C has a one-shot signal measurement 1134 greater than the signal measurement 1114 of cell A by an amount 1144 satisfying equation (1). The UE may select cell C since the signal measurement 1134 of cell C is higher than the signal measurement 1124 of cell B at time t3.

As can be observed, if UE reselect to cell A based on timer A expire first in time before timer B and the timer C while cell C has a much stronger signal strength then cell A, the UE may subsequently reselect to cell C, causing an unnecessary cell reselection to cell A.

In an example, when the UE is performing the camping process for camping on cell C, the UE may continue to evaluate cell B. If the UE fails to camp on cell C (e.g., due to system information decoding failure, cell C being a barred cell, and/or cell C belonging to a forbidden PLMN) and cell B's signal strength remains above a certain threshold, the UE may select to camp on cell B.

In an embodiment, a UE (e.g., the UEs 115 and 215, and 400) may employ any suitable combination of the methods 600, 700, and 1000. For example, the UE may employ the methods 600 and 700 to reselect to a higher priority cell and may employ the method 1000 to reselect to an intra-frequency cell (of equal priority as the serving frequency) when selecting to a higher priority cell fails.

Figure 12A:
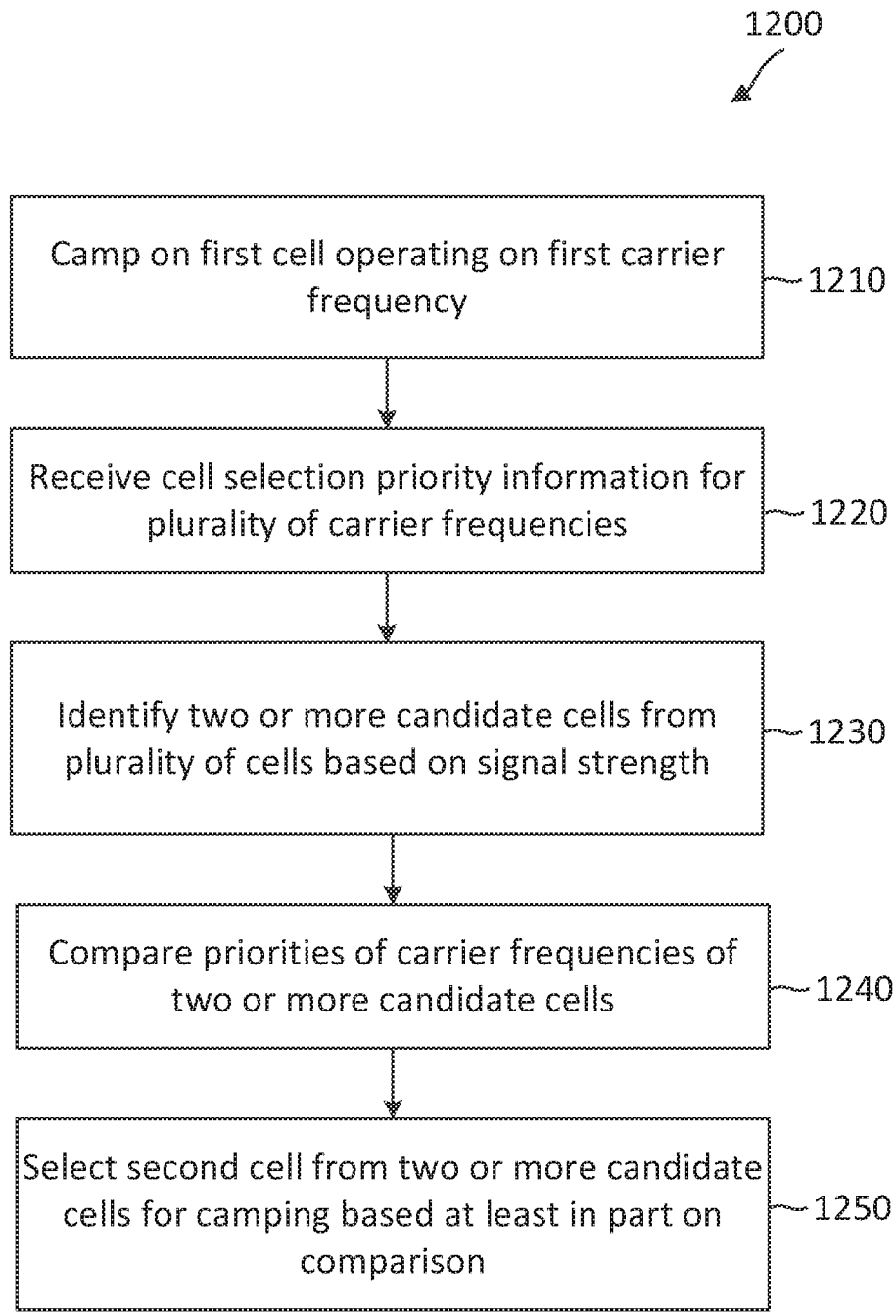
FIG. 12A is a flow diagram of an inter-frequency and/or inter-RAT cell reselection method according to some embodiments of the present disclosure.
Figure 12B:
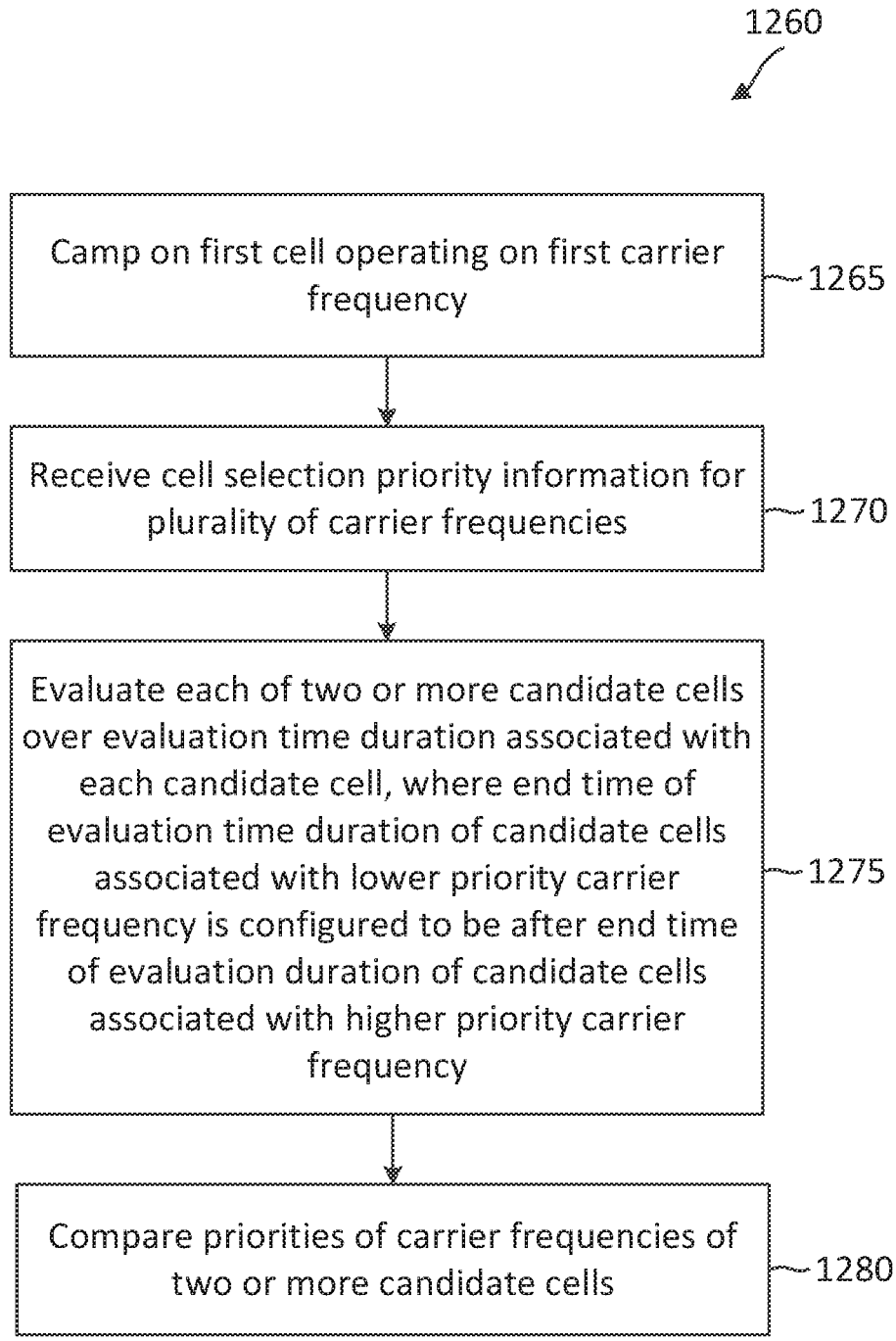
FIG. 12B is a flow diagram of an inter-frequency and/or inter-RAT cell reselection method according to some embodiments of the present disclosure.

FIGS. 12A and 12B illustrate mechanisms for inter-frequency and/or inter-RAT cell reselection. FIG. 12A is a flow diagram of an inter-frequency and/or inter-RAT cell reselection method 1200 according to some embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the transceiver 410, the modem 412, and the one or more antennas 416, to execute the steps of method 1200. The method 1200 may employ similar mechanisms as in the methods 600 and 700 described with respect to FIGS. 6 and 7, respectively, and the scenarios 8 and 9 described with respect to FIGS. 8 and 9, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes camping, by a wireless communication device, on a first cell (e.g., the cell 110 or 210) operating on a first carrier frequency.

At step 1220, the method 1200 includes receiving, by the wireless communication device from the first cell, cell selection priority information (e.g., SIB 2, SIB 4, and/or SIB 5) indicating a priority for each of a plurality of carrier frequencies. The priority may be an absolute cell reselection priority configured by the network.

At step 1230, the method 1200 includes identifying, by the wireless communication device, two or more candidate cells (e.g., cells A and B in the scenarios 800 and/or 900 or cells A, B, and C in the method 700) from a plurality of cells based on a signal strength, each candidate cell operating on one of the plurality of carrier frequencies.

At step 1240, the method 1200 includes comparing, by the wireless communication device, the priorities of the carrier frequencies of the two or more candidate cells.

At step 1250, the method 1200 includes selecting, by the wireless communication device, a second cell (e.g., cell A in the scenario 800 and/or 900 and/or cell A in the method 700) from the two or more candidate cells for camping based at least in part on the comparison of the priorities of the carrier frequencies of the two or more candidate cells.

In an embodiment, the wireless communication device selects the second cell based on the carrier frequency of the second cell including a highest priority among the carrier frequencies of the two or more candidate cells.

In an embodiment, the wireless communication device identifies the two or more candidate cells by determining which of the plurality of cells includes a signal strength (e.g., RSRP or RSRQ) satisfying a threshold associated with the carrier frequency of the cell. In an embodiment, the second cell is selected in response to a determination that the signal strength of the second cell satisfies the threshold associated with the carrier frequency of the second cell for a first evaluation duration (e.g., the evaluation duration 802). In an embodiment, the wireless communication device gives priority to selection of the second cell (e.g., the highest priority candidate cell) by refraining from selecting a third cell (e.g., cell B in the scenario 800 or 900) of the two or more candidate cells when the signal strength of the third cell satisfies the threshold associated with the carrier frequency of the third cell for a second evaluation duration. For example, the third cell may operate on a carrier frequency having a lower frequency priority than the carrier frequency of the second cell. Thus, the refraining from selecting the third cell when the evaluation of the third cell is completed allows the selection to the higher-priority second cell instead of selecting the third cell and then selecting to the second cell shortly afterwards. As such, an unnecessary selection to the third cell can be avoided, thus allowing power savings at the wireless communication device. In an embodiment, the wireless communication device detects a failure in camping on the second cell (e.g., due to system information decoding failure in the second cell, the second cell being a barred cell, and/or the second cell belonging to a forbidden PLMN). The wireless communication device selects, in response to the failure, a third cell (e.g., cell B in the scenario 800 or 900) from the two or more candidate cells based on the comparison of the priorities of the carrier frequencies of the two or more candidate cells, where the third cell is different from the second cell. In an embodiment, the third cell is selected further based on the signal strength of the third cell satisfying the threshold associated with the carrier frequency of the third cell for at least a second evaluation duration (e.g., the evaluation duration 804). In an embodiment, the wireless communication device receives, from the first cell, cell selection timing information indicating the first evaluation duration and a second evaluation duration. The wireless communication device configures a first timer (e.g., timer A in the scenario 800 or 900) for monitoring the signal strength of the second cell based on the first evaluation duration (e.g., the evaluation duration 804). The wireless communication device adjusts the second evaluation duration (e.g., from the evaluation duration 804 to the evaluation duration 806) based on the comparison of the priorities of the carrier frequencies of the two or more candidate cells. The wireless communication device configures a second timer (e.g., timer B in the scenario 800 or 900) for monitoring the signal strength of the third cell based on the adjustment of the second evaluation duration. In an embodiment, the wireless communication device updates, in response to the failure in camping on the second cell, a configuration of the second timer based on an elapsed duration associated with the second timer and the second evaluation duration.

In an embodiment, the second cell is further selected based on a preemption timer (e.g., a maximum allowable time period for preemption low priority cells) during which no cell is selected for camping being exceeded.

In an embodiment, the second cell is at least one of an inter-frequency neighboring cell of the first cell or an inter-RAT neighboring cell of the first cell.

FIG. 12B is a flow diagram of an inter-frequency and/or inter-RAT cell reselection method 1260 according to some embodiments of the present disclosure. Steps of the method 1260 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the transceiver 410, the modem 412, and the one or more antennas 416, to execute the steps of method 1260. The method 1260 may employ similar mechanisms as in the methods 600, 700, and 1200 described with respect to FIGS. 6, 7, and 12A, respectively, and the scenarios 8 and 9 described with respect to FIGS. 8 and 9, respectively. As illustrated, the method 1260 includes a number of enumerated steps, but embodiments of the method 1260 may include additional steps before, after, and in between the enumerated steps. In some embodiments, one or more of the enumerated steps may be omitted or performed in a different order.

At step 1265, the method 1260 includes camping, by a wireless communication device, on a first cell (e.g., the cell 110 or 210) operating on a first carrier frequency.

At step 1270, the method 1260 includes receiving, by the wireless communication device from the first cell, cell selection priority information (e.g., SIB 2, SIB 4, and/or SIB 5) indicating a priority for each of a plurality of carrier frequencies.

At step 1275, the method 1260 includes evaluating, by the wireless communication device, each of two or more candidate cells (e.g., cells A and B in the scenarios 800 and/or 900 or cells A, B, and C in the method 700) over an evaluation time duration associated with each candidate cell, wherein an end time of the evaluation time duration of a candidate cell associated with a lower priority carrier frequency is configured to be after an end time of the evaluation time duration of a candidate cell associated with a higher priority carrier frequency. In one implementation, the end time of the evaluation time duration of the candidate cell associated with the lower priority carrier frequency can be configured to be after the end time of the evaluation time duration of the candidate cell associated with the higher priority carrier frequency by adjusting a timer associated with the candidate cell associated with the lower priority carrier frequency, for example, adjusting timer B as discussed with reference to FIGS. 8 and 9.

At step 1280, the method 1260 includes selecting, by the wireless communication device, a second cell (e.g., cell A in the scenario 800 and/or 900 and/or cell A in the method 700) from the two or more candidate cells for camping based at least in part on the evaluation of the second cell over the evaluation time duration of the second cell.

In an embodiment, the wireless communication device identifies the two or more candidate cells from a plurality of cells by determining which of the plurality of cells includes a signal strength (e.g., RSRP or RSRQ) satisfying a threshold associated with the carrier frequency of the cell.

In an embodiment, the wireless communication device selects the second cell over a third cell (e.g., cell B in the scenario 800 and/or 900 and/or cell B in the method 700) of the two or more candidate cells based on relative priorities between a second carrier frequency associated with the second cell and a third carrier frequency associated with the third cell. In an embodiment, the wireless communication device detects a failure in camping on the second cell. The wireless communication device selects, in response to the failure, the third cell (e.g., cell B in the scenario 900) from the two or more candidate cells. In an embodiment, the selecting the third cell is based on the evaluation of the third cell for the evaluation time duration of the third cell. In an embodiment, the wireless communication device receives, from the first cell, cell selection timing information indicating a reference time duration (e.g., the evaluation duration 804 of cell B in FIG. 8) associated with the third cell. The wireless communication device adjusts the reference time duration (e.g., from the evaluation duration 804 to the evaluation duration 806) based on the priority of the carrier frequency of the third cell relative to the priority of the carrier frequency of the second cell, where the evaluation time duration for the third cell equals the adjusted reference time duration. The wireless communication device configures a timer for evaluating the signal strength of the third cell based on the evaluation time duration of the third cell. In an embodiment, the wireless communication device updates, in response to the failure in camping on the second cell, a configuration of the timer based on an elapsed duration associated with the timer and the evaluation time duration of the third cell.

In an embodiment, the selecting is further based on a duration (e.g., a maximum allowable time period for pre-emption low priority cells) during which no cell is selected for camping being exceeded.

In an embodiment, the second cell is at least one of an inter-frequency neighboring cell of the first cell or an inter-radio access technology (inter-RAT) neighboring cell of the first cell.

Figure 13:
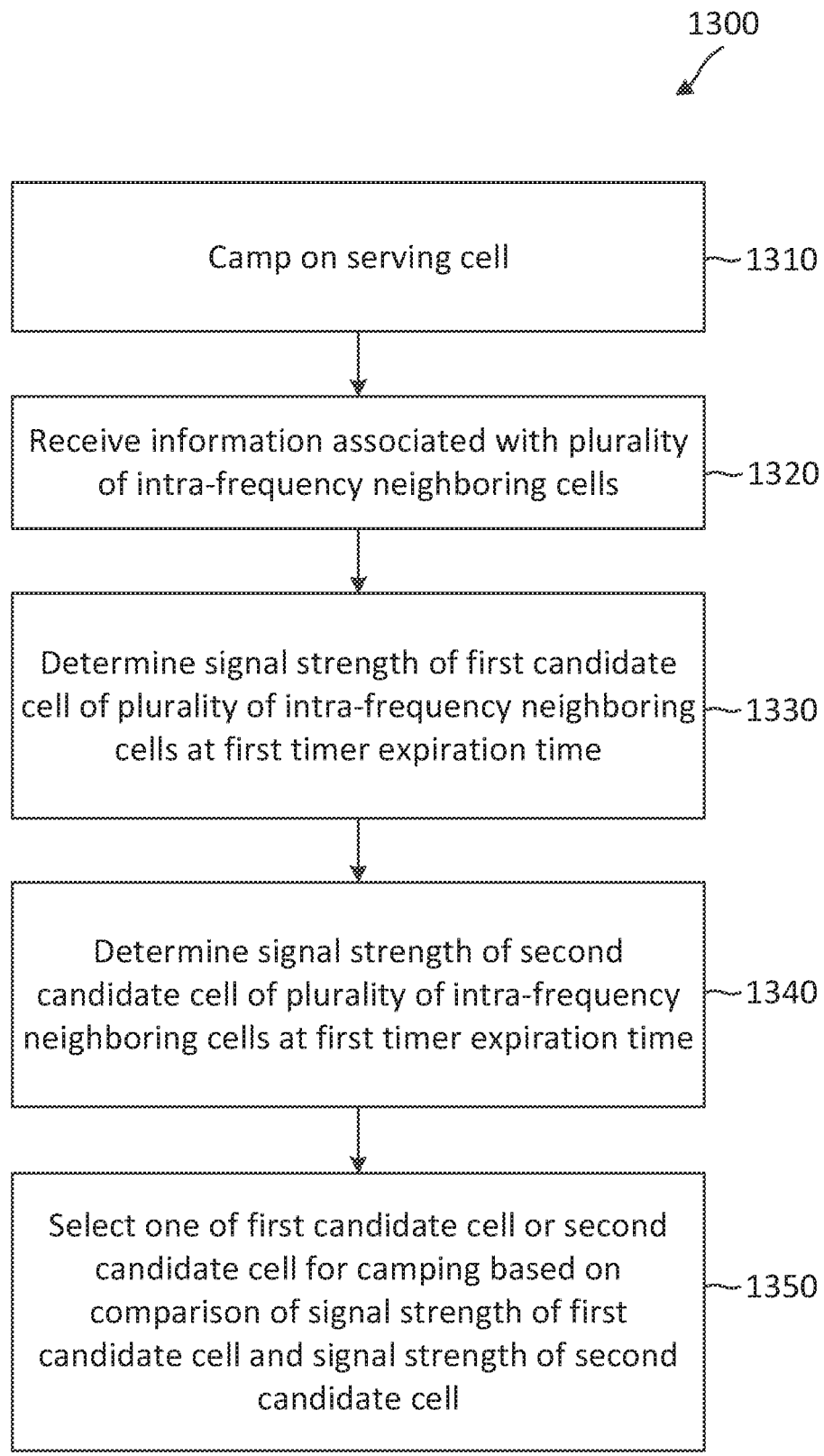
FIG. 13 is a flow diagram of an intra-frequency cell reselection method according to some embodiments of the present disclosure.

FIG. 13 is a flow diagram of an intra-frequency cell reselection method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the transceiver 410, the modem 412, and the one or more antennas 416, to execute the steps of method 1300. The method 1300 may employ similar mechanisms as in the method 1000 described with respect to FIG. 10 and the scenario 11 described with respect to FIG. 11. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes camping, by a wireless communication device, on a serving cell (e.g., the cell 110 or 210).

At step 1320, the method 1300 includes receiving, by the wireless communication device, information (e.g., SIB 2 and/or SIB 3) associated with a plurality of intra-frequency neighboring cells. As one example, the information can include a list of intra-frequency neighboring cells.

At step 1330, the method 1300 includes determining, by the wireless communication device, a signal strength (e.g., the signal measurements 1112 with reference to FIG. 11) of a first candidate cell (e.g., cell A with reference to FIG. 11) of the plurality of intra-frequency neighboring cells at a first timer expiration time (e.g., time t3 with reference to FIG. 11).

At step 1340, the method 1300 includes determining, by the wireless communication device, a signal strength (e.g., the signal measurements 1124 or 1134 with reference to FIG. 11) of a second candidate cell (e.g., cell B or cell C with reference to FIG. 11) of the plurality of intra-frequency neighboring cells at the first timer expiration time. The first candidate cell and the second candidate cell (and any other candidate cells) remain "candidate" cells during evaluation because they maintain signal strengths above a threshold, for example threshold 1104 or other suitable threshold (which may also be cell dependent), for at least an evaluation duration (e.g., the duration 1102, 1104, or 1106).

At step 1350, the method 1300 includes selecting, by the wireless communication device, one of the first candidate cell or the second candidate cell for camping based on a comparison of the signal strength of the first candidate cell and the signal strength of the second candidate cell.

In an embodiment, the first timer expiration is associated with an evaluation of the first candidate cell (e.g., cell A with reference to FIG. 11). In one example, the wireless communication device selects the first candidate cell if the signal strength of the first candidate cell at the first timer expiration time is greater than the signal strength of the second candidate cell at the first timer expiration time. In another example, the wireless communication device selects the second candidate cell if the signal strength of the second candidate cell at the first timer expiration time is greater than the signal strength of the first candidate cell at the first timer expiration time by a threshold margin, for example, as described with reference to equation (1). For example, the selecting is further based on the signal strength of the second candidate cell being stronger than a signal strength of the serving cell by a threshold (e.g., Delta_strength of equation (1)).

In an embodiment, the first timer expiration is associated with an evaluation of the first candidate cell (e.g., cell A with reference to FIG. 11) and selecting includes selecting the second cell (e.g., cell C with reference to FIG. 11). The selecting is further based on at least one of a comparison between the signal strength of the second candidate cell and a signal strength of a third candidate cell (e.g., cell B with reference to FIG. 11) or a comparison between an evaluation duration associated with the second candidate cell and an evaluation duration associated with the third candidate cell. In an embodiment, the wireless communication device detects a failure in camping on the second candidate cell. The wireless communication device selects, in response to the failure, the third candidate cell for camping.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
camping, by a wireless communication device, on a first cell operating on a first carrier frequency;
receiving, by the wireless communication device from the first cell, cell selection priority information indicating a priority for each of a plurality of carrier frequencies;
evaluating, by the wireless communication device, each of two or more candidate cells over an evaluation time duration associated with each candidate cell, wherein an end time of the evaluation time duration of a candidate cell associated with a lower priority carrier frequency is configured to be after an end time of the evaluation time duration of a candidate cell associated with a higher priority carrier frequency; and
selecting, by the wireless communication device, a second cell from the two or more candidate cells for camping based at least in part on the evaluation of the second cell over the evaluation time duration of the second cell.

2. The method of claim 1, further comprising:
identifying, by the wireless communication device, the two or more candidate cells from a plurality of cells by determining which of the plurality of cells includes a signal strength satisfying a threshold associated with the carrier frequency of the cell.

3. The method of claim 1, wherein the selecting includes:
selecting, by the wireless communication device, the second cell over a third cell of the two or more candidate cells based on relative priorities between a second carrier frequency associated with the second cell and a third carrier frequency associated with the third cell.

4. The method of claim 3, further comprising:
detecting, by the wireless communication device, a failure in camping on the second cell; and
selecting, by the wireless communication device in response to the failure, the third cell from the two or more candidate cells.

5. The method of claim 4, wherein the selecting the third cell is based on the evaluation of the third cell for the evaluation time duration of the third cell.

6. The method of claim 4, further comprising:
receiving, by the wireless communication device from the first cell, cell selection timing information indicating a reference time duration associated with the third cell;
adjusting, by the wireless communication device, the reference time duration based on the priority of the carrier frequency of the third cell relative to the priority of the carrier frequency of the second cell, wherein the evaluation time duration for the third cell equals the adjusted reference time duration; and
configuring, by the wireless communication device, a timer for evaluating the signal strength of the third cell based on the evaluation time duration of the third cell.

7. The method of claim 6, further comprising:
updating, by the wireless communication device in response to the failure in camping on the second cell, a configuration of the timer based on an elapsed duration associated with the timer and the evaluation time duration of the third cell.

8. The method of claim 1, wherein the selecting is further based on a duration during which no cell is selected for camping being exceeded.

9. The method of claim 1, wherein the second cell is at least one of an inter-frequency neighboring cell of the first cell or an inter-radio access technology (inter-RAT) neighboring cell of the first cell.

10. A method of wireless communication, comprising:
camping, by a wireless communication device, on a serving cell;
receiving, by the wireless communication device, information associated with a plurality of intra-frequency neighboring cells;
determining, by the wireless communication device, a signal strength of a first candidate cell of the plurality of intra-frequency neighboring cells at a first timer expiration time;
determining, by the wireless communication device, a signal strength of a second candidate cell of the plurality of intra-frequency neighboring cells at the first timer expiration time; and
selecting, by the wireless communication device, one of the first candidate cell or the second candidate cell for camping based on a comparison of the signal strength of the first candidate cell and the signal strength of the second candidate cell.

11. The method of claim 10, wherein the first timer expiration time is associated with an evaluation of the first candidate cell, and wherein the selecting includes selecting the second candidate cell based on the comparison.

12. The method of claim 11, wherein the selecting is further based on the signal strength of the second candidate cell being stronger than a signal strength of the serving cell by a threshold.

13. The method of claim 11, wherein the selecting is further based on at least one of:
a comparison between the signal strength of the second candidate cell and a signal strength of a third candidate cell; or
a comparison between an evaluation duration associated with the second candidate cell and an evaluation duration associated with the third candidate cell.

14. The method of claim 13, further comprising:
detecting, by the wireless communication device, a failure in camping on the second candidate cell; and
selecting, by the wireless communication device in response to the failure, the third candidate cell for camping.

15. The method of claim 10, wherein the information includes a list of intra-frequency neighboring cells.

16. An apparatus comprising:
a transceiver configured to receive, from a first cell operating on a first carrier frequency, cell selection priority information indicating a priority for each of a plurality of carrier frequencies;
a processor configured to:
camp on the first cell;
evaluate each of two or more candidate cells over an evaluation time duration associated with each candidate cell, wherein an end time of the evaluation time duration of a candidate cell associated with a lower priority carrier frequency is configured to be after an end time of the evaluation time duration of a candidate cell associated with a higher priority carrier frequency; and
select a second cell from the two or more candidate cells for camping based at least in part on the evaluation of the second cell over the evaluation time duration of the second cell.

17. The apparatus of claim 16, wherein the processor is further configured to:
identify the two or more candidate cells from a plurality of cells by determining which of the plurality of cells includes a signal strength satisfying a threshold associated with the carrier frequency of the cell.

18. The apparatus of claim 16, wherein the processor configured to select the second cell is further configured to:
select the second cell over a third cell of the two or more candidate cells based on relative priorities between a second carrier frequency associated with the second cell and a third carrier frequency associated with the third cell.

19. The apparatus of claim 18, wherein the processor is further configured to:
detect a failure in camping on the second cell; and
select, in response to the failure, the third cell from the two or more candidate cells.

20. The apparatus of claim 19, wherein the processor configured to select the third cell is further configured to:
select the third cell based on the evaluation of the third cell for the evaluation time duration of the third cell.

21. The apparatus of claim 19, wherein:
the transceiver is further configured to:
receive, from the first cell, cell selection timing information indicating a reference time duration associated with the third cell, and
the processor is further configured to:
adjust the reference time duration based on the priority of the carrier frequency of the third cell relative to the priority of the carrier frequency of the second cell, wherein the evaluation time duration for the third cell equals the adjusted reference time duration; and
configure a timer for evaluating a signal strength of the third cell based on the evaluation time duration of the third cell.

22. The apparatus of claim 21, wherein the processor is further configured to:
update, in response to the failure in camping on the second cell, a configuration of the timer based on an elapsed duration associated with the timer and the evaluation time duration of the third cell.

23. The apparatus of claim 16, wherein the processor configured to select the second cell is further configured to:
select the second cell further based on a duration during which no cell is selected for camping being exceeded.

24. The apparatus of claim 16, wherein the second cell is at least one of an inter-frequency neighboring cell of the first cell or an inter-radio access technology (inter-RAT) neighboring cell of the first cell.

25. An apparatus comprising:
a transceiver configured to receive information associated with a plurality of intra-frequency neighboring cells associated with a serving cell; and
a processor configured to:
camp on the serving cell;
determine a signal strength of a first candidate cell of the plurality of intra-frequency neighboring cells at a first timer expiration time;
determine a signal strength of a second candidate cell of the plurality of intra-frequency neighboring cells at the first timer expiration time; and
select one of the first candidate cell or the second candidate cell for camping based on a comparison of the signal strength of the first candidate cell and the signal strength of the second candidate cell.

26. The apparatus of claim 25, wherein the first timer expiration time is associated with an evaluation of the first candidate cell, and wherein the transceiver configured to select one of the first candidate cell or the second candidate cell for camping is further configured to:
select the second candidate cell based on the comparison.

27. The apparatus of claim 26, wherein the transceiver configured to select one of the first candidate cell or the second candidate cell for camping is further configured to:
select one of the first candidate cell or the second candidate cell for camping further based on the signal strength of the second candidate cell being stronger than a signal strength of the serving cell by a threshold.

28. The apparatus of claim 26, wherein the transceiver configured to select one of the first candidate cell or the second candidate cell for camping is further configured to:
select one of the first candidate cell or the second candidate cell for camping further based on at least one of:
a comparison between the signal strength of the second candidate cell and a signal strength of a third candidate cell; or
a comparison between an evaluation duration associated with the second candidate cell and an evaluation duration associated with the third candidate cell.

29. The apparatus of claim 28, wherein the processor is further configured to:
detect a failure in camping on the second candidate cell; and
select, in response to the failure, the third candidate cell for camping.

30. The apparatus of claim 25, wherein the information includes a list of intra-frequency neighboring cells.

* * * * *